(12) United States Patent
Sasaki et al.

(10) Patent No.: US 6,947,374 B2
(45) Date of Patent: Sep. 20, 2005

(54) APPARATUS FOR USER CONNECTION SETTING IN A CONNECTION ORIENTED MODE COMMUNICATION SYSTEM

(75) Inventors: Taisuke Sasaki, Kawasaki (JP);
Yoshihiro Watanabe, Kawasaki (JP);
Takao Yoshida, Kawasaki (JP);
Yoshihiro Uchida, Kawasaki (JP); Yuji Tazaki, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 792 days.

(21) Appl. No.: 09/808,091

(22) Filed: Mar. 14, 2001

(65) Prior Publication Data

US 2001/0036153 A1 Nov. 1, 2001

(30) Foreign Application Priority Data

Apr. 28, 2000 (JP) ........................................ 2000-129689
Apr. 28, 2000 (JP) ........................................ 2000-131125

(51) Int. Cl.$^7$ .............................................. G01R 31/08
(52) U.S. Cl. ........................................ 370/218; 370/244
(58) Field of Search .............................. 370/216, 217, 370/221–226, 229, 236.1, 236.2, 245, 241.1, 242, 243, 247, 251, 236, 380, 218, 396, 223, 353, 354, 227, 249, 404, 395.51

(56) References Cited

U.S. PATENT DOCUMENTS

| 5,793,745 | A | * | 8/1998 | Manchester ................. 370/224 |
| 5,933,422 | A | * | 8/1999 | Kusano et al. ............... 370/331 |
| 6,256,292 | B1 | * | 7/2001 | Ellis et al. ................... 370/227 |
| 6,317,414 | B1 | * | 11/2001 | Naohiro ....................... 370/222 |
| 6,483,809 | B2 | * | 11/2002 | Shimada ................... 370/241.1 |
| 6,553,034 | B2 | * | 4/2003 | Chan et al. .................. 370/397 |
| 6,560,202 | B1 | * | 5/2003 | Bordogna et al. .......... 370/248 |
| 6,580,709 | B1 | * | 6/2003 | Gorshe et al. .............. 370/352 |
| 6,594,232 | B1 | * | 7/2003 | Dupont ....................... 370/224 |
| 6,597,656 | B1 | * | 7/2003 | Blanc et al. ................. 370/219 |
| 6,687,231 | B1 | * | 2/2004 | Czerwiec et al. ........... 370/244 |
| 6,744,726 | B1 | * | 6/2004 | Minami ....................... 370/217 |

FOREIGN PATENT DOCUMENTS

| JP | 59186447 J PX | 10/1984 | |
| JP | 07-038573 | 2/1995 | |
| JP | 07038573 A | * 2/1995 | ........... H04L/12/28 |

OTHER PUBLICATIONS

GR–1400–CORE, SONET dual–fed unidirectional path switched ring (UPSR) equipment generic criteria, Jan. 1999, Bellcore, issue 2, entire document.*

GR–2837–CORE, ATM virtual path ring functinality in SONET generic crietia, Feb. 1998, Bellcore, issue 4, entire document.*

* cited by examiner

*Primary Examiner*—Bob Phunkulh
*Assistant Examiner*—Ian N. Moore
(74) *Attorney, Agent, or Firm*—Katten Muchin Rosenman LLP

(57) ABSTRACT

In a connection oriented mode communication system, a communication connection is established as an alternative connection substitutive for a currently working communication connection so that the alternative connection connects the couple of node apparatus connected through the currently working communication connection to each other by way of a route physically different from that of the currently working communication connection. According to the above arrangement, it becomes possible to carry out maintenance, moving of facility or the like of a network including the currently working connection without interrupting the service which is provided through the currently working connection.

16 Claims, 26 Drawing Sheets

FIG. 7(a)

ALTERNATIVE CONNECTION ASSIGNMENT TABLE 51

| TARGET VPI/VCI | COPY SOURCE VPI/VCI | COPY DESTINATION VPI/VCI | Alternative Route |
|---|---|---|---|
| 0/32 | 50/100 | 51/100 | 0 |
| : | : | : | : |

| 0 | Alternative Route NOT UTILIZED |
|---|---|
| 1 | Alternative Route UTILIZED |

FIG. 8

52
RECEIVING SIDE HEADER INVERSE
CONVERSION TABLE
53

| I-ICID-A | VPI/VCI | Enable |
|---|---|---|
|  |  |  |
| 100 | 0/32 | 1 |
|  |  |  |
| 101 | 0/32 | 0 |
|  |  |  |

FIG.11

| PARAMETER | CONTENTS | NOTE |
|---|---|---|
| CV | CODING VIOLATION | ABOUT BIT ERROR, PRESENT OR NOT |
| ES | ERRORED SECOND | NUMBER OF DETECTED EVENTS OF CV, AiS AND SO ON |
| SES | SEVCRELY ERRORED SECOND | ERROR SUCH AS CV, AiS AND SO ON LARGER THAN ES |
| SAS | SEF/AiS SECOND | |
| AiSS | AiS SECOND | |
| UASP | UNAVAILABLE SECOND | |

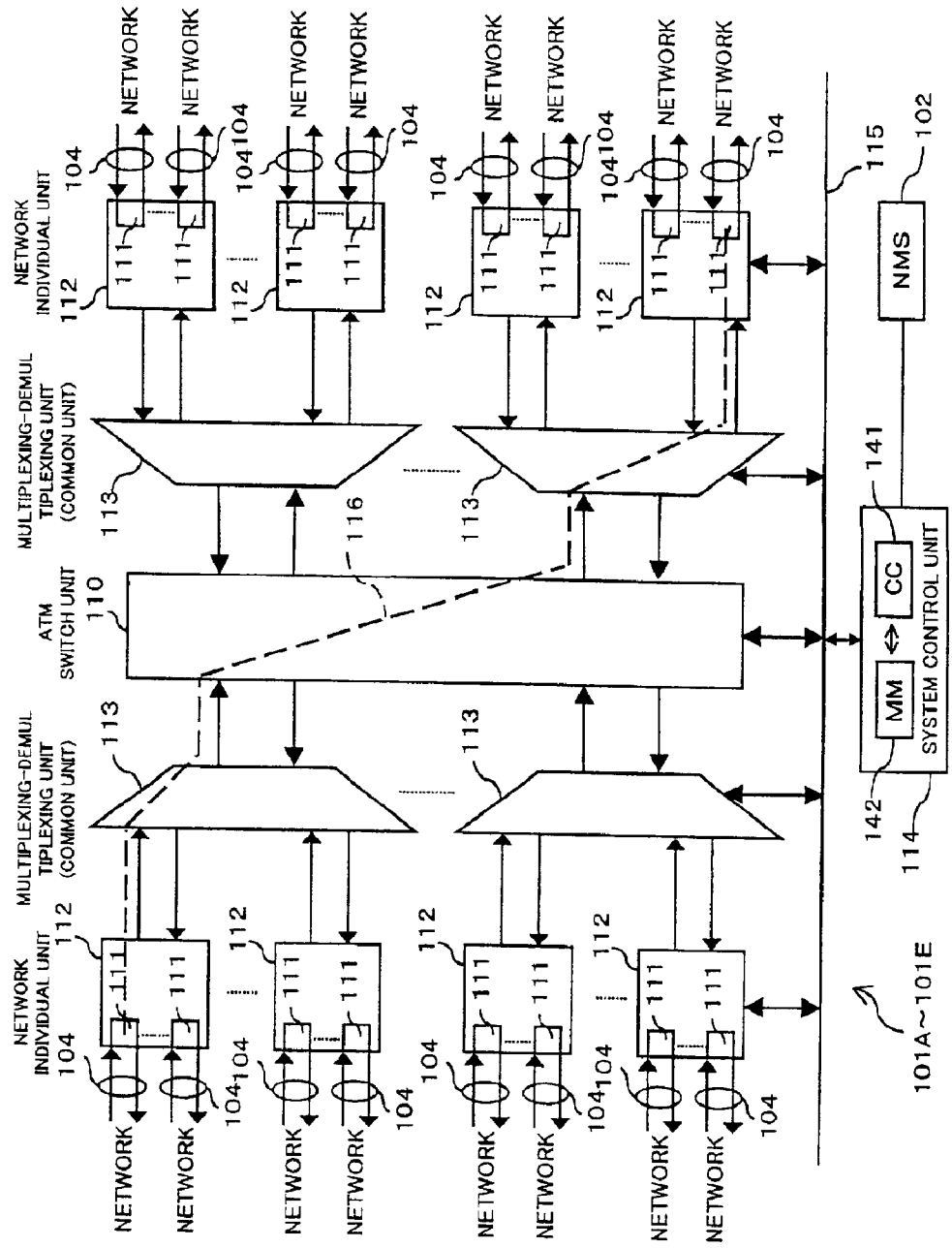

APPARATUS FOR USER CONNECTION SETTING IN A CONNECTION ORIENTED MODE COMMUNICATION SYSTEM

BACKGROUND OF THE INVENTION (1) Field of the Invention

The present invention relates to a connection oriented mode communication system suitable for use in, for example, a communication technology of an ATM (Asynchronous Transfer Mode) communication system in which a virtual communication path (virtual connection) is established and communication is effected by means of the communication path. The present invention also relates to a node apparatus for use in such connection oriented mode communication system and a connection setting method.

(2) Description of Related Art

FIG. 25 is a block diagram showing one example of an existing ATM network. In an ATM network 100 shown in FIG. 25, for example, a plurality of ATM nodes 101A to 101E such as an ATM switch (ATM-SW) are unitarily subjected to management of topology (network arrangement) information of the ATM network 100, whereby a network management system (NMS) 102 can manage call processing control such as call setting control including an establishment of PVC (Permanent Virtual Connection) or the like for each of the ATM nodes (hereinafter sometimes referred to as simply node) 101A to 101E.

As shown in FIG. 25, the ATM node 101A and the ATM node 101D are arranged to accommodate subscriber's terminals 103A and 103D, respectively. Conversely, the ATM nodes 101B, 101C and 101E are arranged to serve as a relaying node for relaying signals between the nodes 101A and 101D.

While in FIG. 25 the ATM nodes 101A to 101E are connected to one another sequentially through a single physical connection line 104, actually the ATM nodes 101A to 101E are connected to one another in a mesh-manner through a proper number of the physical connection lines 104. Also, the number of nodes constituting the ATM network 100 is not limited to the number of nodes appearing in FIG. 25.

Now, in the above-described existing ATM network 100, it is assumed that, as for example shown with a broken line 105 in FIG. 26, the subscriber's terminals 103A and 103D are connected through a PVC [virtual (communication) connection] of a physical link which is established so as to include the ATM nodes 101A, 101B, 101C and 101D.

In this case, according to the arrangement of the existing ATM network 100, for example, the NMS 102 generates Connection (PVC) Setting Request 106 to each of the ATM nodes 101A, 101B, 101C and 101D, and each of the ATM nodes 101A, 101B, 101C and 101D builds a set of assignments of connection effective in the apparatus (hereinafter referred to as intra-unit connection) which indicates a transfer route of a received signal extending through the virtual connection on the input-and-output sides and the apparatus itself. Thus, a communication connection by way of the ATM nodes 101A to 101D is established.

As is widely known, according to the ATM communication arrangement, the connection of the above-described type is specified by a virtual path identifier (hereinafter referred to as VPI) and a virtual channel identifier (hereinafter referred to as VCI) which are attached within a header of an ATM cell (hereinafter sometimes referred to as simply "cell") Then, each of the ATM nodes 101A to 101D builds a set of assignments (assignment table) specifying the correspondence between the target of reception VPI/VCI designated by the above-mentioned Connection Setting Request 101 generated from the NMS 102, and the destination of the conversion of the VPI/VCI within the apparatus, ICID (Internal Channel IDentifier) and a tag (TAG) for carrying out routing within the apparatus. Thereafter, each of the ATM nodes 101A to 101D makes a setting effective in the apparatus for the specified received cell based on the assignment table. In this way, a desired connection setting is accomplished.

The PVC setting operation carried out in the ATM nodes 101A to 101D (also 101E) will hereinafter be described in more detail. In the following description, every ATM node 101A to 101D is not discriminated from one another and hence each ATM node 101A to 101D is simply denoted as ATM node 101 so long as it is not specifically noted.

FIG. 26 is a block diagram showing in detail the arrangement of the ATM node 101. As shown in FIG. 26, the ATM node 101 includes, for example, an ATM switching unit 110, a plurality of network individual units 112, multiplexing-demultiplexing units (common units) 113 of which number corresponds to the number of the network individual units 112 actually provided in the ATM node 101, a central controller (CC) 141 and a main memory (MM) 142.

The network individual unit 112 is connected with at least one physical line 104 (hereinafter sometimes referred to as simply "line 104"), whereby the network individual unit 112 serves as an interface unit between the network including the line 104 and the ATM node 101. Thus, the network individual unit 112 is selected so that its type matches with the type of accommodating network.

If the physical line 104 is arranged to accommodate an ordinary ATM network in which ATM cells are mapped on a predetermined signal frame such as a SDH (Synchronous Digital Hierarchy), SONET (Synchronous Optical Network) or the like to accomplish signal transmission (i.e., in a CRS (Cell Relay Service)), it is necessary to provide an interface for each accommodated ATM network 104. For this reason, the network individual unit 112 adapted to the CRS such as one having a network interface (IF) unit 111 for each accommodated ATM network 104 is used.

Conversely, if the physical network 104 accommodates a communication lines in which signal transmission is effected by a temporal frame [in a CES (Circuit Emulation Service)], the actually mounted network individual unit 112 is one adapted to the CES having a function for mapping the ATM cells on the above frame [e.g., AAL1 (ATM Adaptation layer 1) terminating function].

If the network individual unit 112 is the CES type, the signal frame transmitted through a single physical line 104 is subjected to a time division multiplex processing. Further, while in the example illustrated in FIG. 26 all of the network individual units 112 have a network IF unit 111 in order for coping with the CRS, all of the network individual units 112 may be arranged to cope with the CES. Also, the network individual units 112 to the CRS and the network individual units 112 adapted to the CES may be provided in a coexisting fashion in the arrangement of the ATM node.

Whichever the arrangement adapted to the CRS or one adapted to the CES the network individual unit 112 employs, the network individual units 112 is provided with fundamental functions requiring the minimum necessity for setting the virtual connection. That is, the network individual units 112 is provided with a VPI/VCI-ICID converting function that an (input) VPI/VCI attached to the header of the up-link input ATM cell transmitted from the physical network 104 is converted into an input internal channel identifier (I-ICID: Input-ICID) inherent to the node 101 itself, and that an I=ICID of a down-link input cell transmitted from the ATM switch unit 110 is inversely converted into a (output) VPI/VCI.

The multiplexing-demultiplexing unit 113 will hereinafter be described. The multiplexing-demultiplexing unit 113 accommodates the network individual units of which number corresponds to the network transmission rate which is capable of being dealt by the unit itself. The multiplexing-demultiplexing unit 113 is also a unit for carrying out multiplexing and demultiplexing on an ATM cell which is transmitted and received between the network individual unit 112 and the ATM switch unit 114. For example, if the allowable network transmission rate of the ATM switch unit 110 is about 2.4 Gbps and the network individual unit 112 is arranged to cope with a signal of about 155 Mbps level [e.g., a signal based on the SONET of OC (Optical Carrier level)–3], the multiplexing-demultiplexing unit 113 can accommodate 16 channels at maximum. If the network individual unit 112 is arranged to cope with a signal of about 622 Mbps level (e.g., a signal of OC-12), the multiplexing-demultiplexing unit 113 can accommodate four channels at maximum.

The multiplexing-demultiplexing unit 113 includes an assignment table (conversion table) (not shown) which designates an assignment relation (combination information) effective between the I-ICID given by the central controller 141 upon setting a call (virtual connection) and a tag and O-ICID (output-ICID: Output internal channel identifier). The multiplexing-demultiplexing unit 113 attaches a tag corresponding to the I-ICID of the input cell from the network individual unit 112 to the cell based on the assignment relation. The multiplexing-demultiplexing unit 113 also has a function to convert the corresponding I-ICID into an O-ICID, delete tag-information of the input cell from the ATM switch unit 110, and convert the O-ICID into the I-ICID.

The ATM switch unit 110 also has a function of switching on the cell in accordance with the tag attached to the cell from each of the multiplexing-demultiplexing units 113, thus supplying the cell to a predetermined multiplexing-demultiplexing unit 113. For example, the ATM switch unit 110 repeats selection of one out of two choices, "1" or "0" at every bit of the tag, whereby ATM switch unit 110 carries out switching operation independently.

The central controller 141 is a unit for communicating with respective components 110 to 113 through a bus line 115 so that these components 110 to 113 are intensively controlled. Thus, various setting necessary for call control processing can be achieved. For example, the central controller 141 assigns the VPI/VCI to a call as a target of PVC setting in accordance with the contents of PVC Setting Request 106 from the NMS 102. Then, the central controller 141 converts the VPI/VCI into the internal channel identifier (ICID) which specifies the component address within the node itself (e.g., input/output port number of the multiplexing-demultiplexing unit 113 or the like) that the input cell shall undergo (i.e., connection settled within the component). Thereafter, the central controller 141 determines the tag based on the internal channel identifier.

The main memory 142 is a unit for storing therein data, program (software, firmware) or the like which are necessary for the central controller 141 to operate.

In the above-described ATM node, the PVC (virtual connection) is set in the following manner. That is, when the central controller 141 receives Connection Setting Request 106 from the NMS 102, the above-described ATM node assigns the VPI/VCI (VPI/VCI effective within the component) to the received VPI/VCI as the connection setting target designated by Connection Setting Request 106. Also, the central controller 141 converts the VPI/VCI effective within the component into the I-ICID and further determines the above-described tag and O-ICID so as to correspond to the I-ICID.

The determined assignment relation (combination information) is sent to the corresponding cell input-side multiplexing-demultiplexing unit 113 and cell output-side multiplexing-demultiplexing unit 113, respectively. Each of the cell input-side multiplexing-demultiplexing unit 113 and cell output-side multiplexing-demultiplexing unit 113 holds the combination information as a piece of data of a table-style (assignment table). At this time, the central controller 141 sends data indicative of the assignment relation between the VPI/VCI and the I-ICID and data indicative of a reserved band (band reported by the user) to the network individual unit 112 on the input side (output side).

When the above combination information is supplied from the central controller 141 to the network individual unit 112, the network individual unit 112 holds the combination information as a set of table style data (assignment table), whereby the network individual unit 112 carries out VPI/VCI-ICID conversion setting for the PVC setting target and reserves a band reported by the user.

With the above setting operation, the input cell is converted in its (input) VPI/VCI into the I-ICID by the network individual unit 112, and the converted I-ICID is transmitted to an input port of the multiplexing-demultiplexing unit 113 which is designated by the I-ICID. The multiplexing-demultiplexing unit 113 refers to the I-ICID of the input cell, attaches the tag information corresponding to the I-ICID to the input cell, and converts the I-ICID into O-ICID.

In this way, the input cell is subjected to an automatic switching operation in the ATM switching unit 110 depending on the above tag information, and sent to the corresponding multiplexing-demultiplexing unit 113 on the output side. When the input cell is received by the multiplexing-demultiplexing unit 113 from the ATM switching unit 110, the multiplexing-demultiplexing unit 113 deletes the tag attached to the input cell, specifies an output port for the cell based on the O-ICID, and converts the O-ICID into an I-ICID. Then, the multiplexing-demultiplexing unit 113 outputs the cell to the network individual unit 112 through the corresponding port. Thereafter, the network individual unit 112 converts the I-ICID of the input cell into a corresponding VPI/VCI.

As described above, the ATM 101 makes the network individual unit 112 and the multiplexing-demultiplexing unit 113 hold the data indicative of the assignment relation (table) in accordance with PVC Setting Request 106 supplied from the NMS 102, whereby a transmission route for the cell within the self node 101 (virtual connection; e.g., a broken line 116 in FIG. 26) is established and the cell can be transmitted by way of the virtual connection.

If the virtual connection is established through each of the ATM nodes 101A to 101D in the above-described manner in accordance with PVC Setting Request 106 supplied from the NMS 102, then the PVC (Virtual Connection) setting is accomplished by way of the ATM nodes 101A to 101D.

According to the above-described arrangement of the conventional ATM network 100, however, when an engineer or the like wants to carry out inspection for maintenance or move the facility of the network 104 in which the connection including a plurality of nodes 101 is set, the engineer shall once break the service connection set in the network 104 (currently working connection) and then establish another connection (detouring connection). Thus, the network system cannot help but interrupting the service provided by means of the currently working connection.

In order to avoid such interruption in connection service, for example, there can be considered one solution that the physical network 104 is made redundant between the adjacent nodes 101 so that a desirable connection can be selected upon necessity, as is represented by the APS (Automatic Protection Switching) technology of SDH or SONET. However, according to the technology, to make the physical network 104 redundant is effected at unit of connection between adjacent nodes 101. Therefore, it is impossible to provide a plurality of connection choices including a plurality of nodes 101.

SUMMARY OF THE INVENTION

The present invention is made to solve the above problem. Thus, one object of the present invention is to provide a connection oriented mode communication system in which an alternative connection is settled to make the communication connection redundant so that the route of the alternative connection is physically different from that of an original connection (currently working connection), thereby making it possible for an engineer or the like to carry out inspection for maintenance, move the facility of communication system or do something like that on the network in which the currently working connection is established, without interrupting the connection service provided by means of the currently working connection.

To this end, according to the present invention, there is provided a connection oriented mode communication system for use in a communication system composed of a plurality of node apparatus, including alternative connection setting means for setting a communication connection as an alternative connection substitutive for a currently working communication connection (hereinafter referred to as original connection) so that the alternative connection connects the source node and the destination node of the original connection to each other by way of a route physically different from that of the original connection, and switching control means for controlling switching between the original connection and the alternative connection.

According to the present invention, there is provided a node apparatus for use in a connection oriented mode communication system, including an alternative connection setting processing unit for setting a communication connection as an alternative connection substitutive for a currently working communication connection (hereinafter referred to as original connection) so that the alternative connection connects the source node apparatus and the destination node apparatus of the original connection to each other by way of a route different from that of the original connection, and a switching control unit for controlling switching between the original connection and the alternative connection.

Further, according to the present invention, there is proposed a method of setting connection, including an alternative connection setting step for setting a communication connection as an alternative connection substitutive for a currently working communication connection (hereinafter referred to as original connection) so that the alternative connection connects the source node apparatus and the destination node apparatus of the original connection to each other by way of a route physically different from that of the original connection, and a connection switching step for switching between the original connection and the alternative connection.

Furthermore, according to the present invention, there is proposed a method of setting connection, including a connection setting step for establishing a first communication connection between a source node apparatus and a destination node apparatus, and an alternative connection setting step for establishing a second communication connection as an alternative connection substitutive for the first communication connection so that the second connection connects the source node apparatus and the destination node apparatus of the first communication connection to each other by way of a route physically different from that of the first communication connection.

According to the above arrangement of the present invention, (second) communication connection is settled as an alternative connection to make the communication connection redundant so that the route of the alternative connection is physically different from that of the currently working connection (first communication connection), and these connections are switched therebetween upon necessity. Therefore, even if the currently working connection is broken, the communication serviced by the currently working connection can be maintained. Accordingly, it becomes possible for an engineer or the like to carry out inspection for maintenance, move the facility of communication system or do something like that on the network, without interrupting the connection service provided by means of the currently working connection.

BRIEF DESCRIPTION OF THE DRAWINGS

FIG. 7A is a diagram showing an example of an alternative connection assignment table according to the present embodiment;

FIG. 7B is a diagram showing a concrete example of a switching flag useful when the table of FIG. 7A is activated;

FIG. 8 is a diagram showing an example of a table for inversely converting data of header effective on the receiving side according to the present embodiment;

FIG. 11 is a diagram for explaining physical layer normality confirming items of the alternative connection at a physical terminating unit appearing in FIG. 10;

FIG. 26 is a block diagram showing in detail an arrangement of the ATM node appearing in FIG. 25.

DESCRIPTION OF THE PREFERRED EMBODIMENTS (A) Description of Aspect of Present Invention Initially, one aspect of the present invention will hereinafter be described with reference to the attached drawings.

Figure 1:
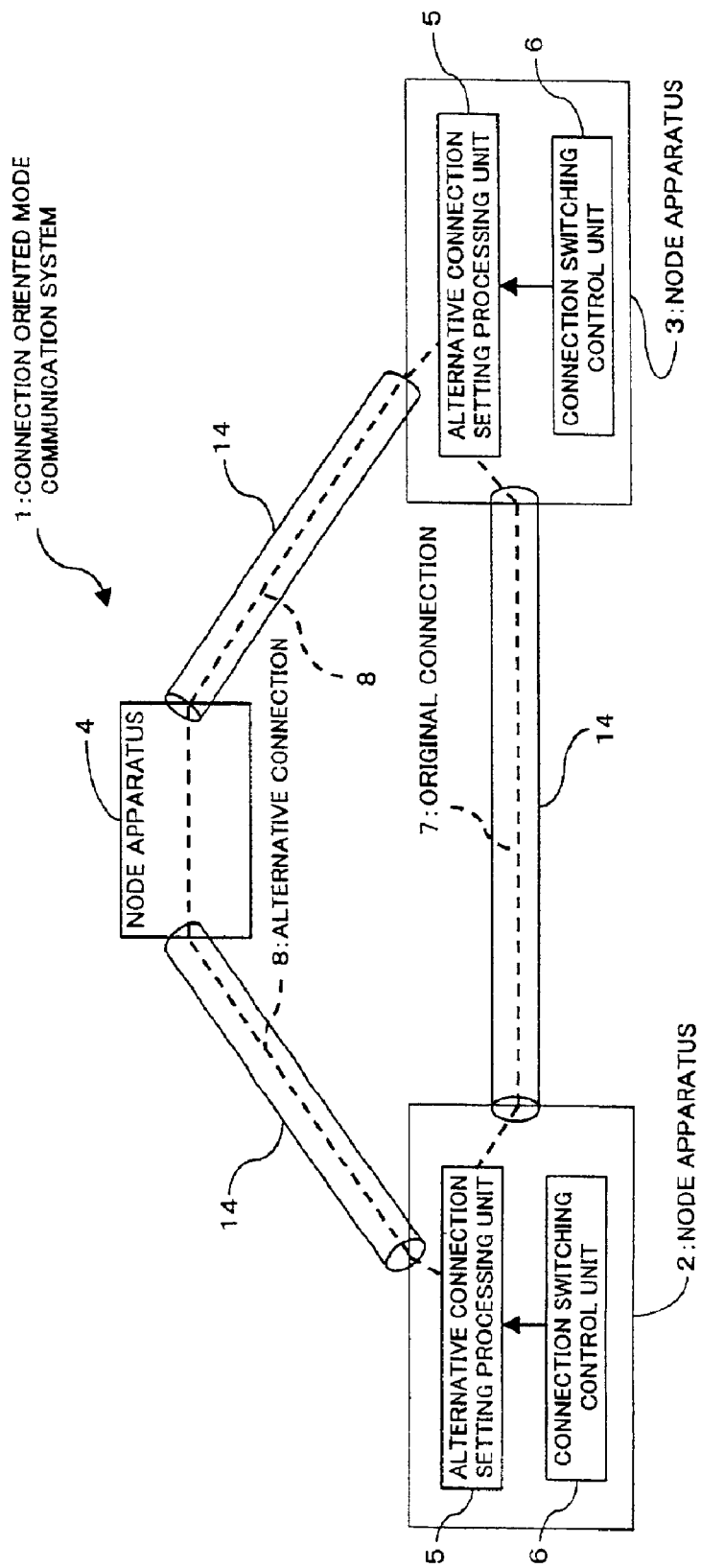
FIG. 1 is a block diagram showing an aspect of the present invention.

FIG. 1 is a block diagram showing the aspect of the present invention. As shown in FIG. 1, a connection oriented mode communication system 1 according to the present invention is a communication system including a plurality of node apparatus 2 to 4. Each of the node apparatus 2 and 3 is composed of, for example, an alternative connection setting processing unit 5 and a connection switching control unit 6. Reference numeral 14 represents a physical line connecting the nodes to each other.

The alternative connection setting processing unit 5 is a unit for setting a communication connection 8 (e.g., a connection routing between the node apparatus 2 and 3 by way of a node apparatus 4) as an alternative connection substitutive for the currently working communication connection 7 (hereinafter referred to as an original connection 7) so that the alternative connection 8 is arranged to have a route physically different from that of the original connection 7. The connection switching control unit 6 is a unit for controlling the switching between the original connection 7 and the alternative connection 8.

That is, the alternative connection setting processing unit 5 provided in each of the node apparatus 2 and 3 serves as alternative connection setting means for setting the communication connection as a connection substitutive for the original connection 7 so that the alternative connection 8 connects the node apparatus 2 and 3 to each other by way of the route physically different from that of the original connection 7. Also, the connection switching control unit 6 serves as switching control means for controlling switching between the original connection 7 and the alternative connection 8.

According to the arrangement of the connection oriented mode communication system 1 described above, initially, the communication connection 8 is set as an alternative connection substitutive for the original connection 7 so that the communication connection 8 has a route physically different from that of the original connection 7 (e.g., route through another node 4). Thus, the communication connection can be established between the node apparatus 2 and 3 through routes physically different from each other, with the result that the communication connection can be made redundant (alternative connection setting step). Thereafter, the connection between the node apparatus 2 and 3 is switched from the original connection 7 to the alternative connection 8 (connection switching step). In this way, even if the original connection 7 is broken, the communication between the node apparatus 2 and 3 can be maintained by using the alternative connection 8.

As described above, according to the present invention, the communication connection (second communication connection) 8 is set as an alternative connection 8 substitutive for the original connection (first communication connection) 7 so that the communication connection 8 has a route physically different from that of the original connection 7, whereby the communication connection can be made redundant. Thus, the operator of the system can switch the connection mode between the connection by way of the original connection 7 and the connection by way of the alternative connection 8. Accordingly, even if the original connection 7 is broken, the communication between the node apparatus 2 and 3 can be maintained by using the alternative connection 8. In this way, it becomes possible for the engineer or the like to carry out network maintenance, move resources of the network to another place or do something like that without interrupting the connection service provided by means of the original connection 7.

Now it is assumed that the node apparatus 2 is a node on the transmitting side and the node apparatus 3 is a node on the receiving side. In this case, the node apparatus 2 on the transmitting side may be arranged to have a cell copy unit for copying transmission cell data which is attached with identification information about the original connection 7 and of which destination is the node apparatus 3 on the receiving side. Further, the connection setting processing unit 5 of the node apparatus 2 on the transmitting side may be arranged to have an identification information setting processing unit for carrying out processing for setting identification information about the alternative connection 8 to the copy cell data which is created by the cell copy unit.

According to the above arrangement, the node apparatus 2 on the transmitting side is brought into a mode in which both of the transmission cell data for the original connection 7 and the copy cell data for the alternative connection 8 can be transmitted to the node apparatus 3 on the receiving side. Accordingly, the communication connection can be made redundant with a simple arrangement and simple processing.

Also in this case, the connection switching control unit 6 of the node apparatus 2 on the transmitting side may be arranged to include a cell copy control unit which carries out switching from the original connection 7 to the alternative connection 8 in such a manner that original transmission cell data, which is attached with identification information of the original connection 7, is made invalid while the copy cell data created by the cell copy unit is made valid.

If the connection switching control unit 6 of the node apparatus 2 is provided with the cell copy control unit arranged as described above, the switching operation from the original connection 7 to the alternative connection 8 can be realized in the node apparatus on the transmitting side by a simple control processing that the original transmission cell data is made invalid while the copy cell data is made valid. The present cell copy control unit may be arranged such that switching from the alternative connection 8 to the original connection 7 is accomplished by a simple control that the cell copy unit is halted from cell copy operation and the original transmission cell data is made valid.

In this case, in the node apparatus 2 on the transmitting side, switching from the original connection 7 to the alternative connection 8 can be accomplished by a simple control operation that original transmission cell data is made invalid while the copy cell data is made valid, and switching from the alternative connection 8 to the original connection 7 is accomplished by a simple control that the original transmission cell data is made valid. Accordingly, the node apparatus 2 on the transmitting side can be simplified in its arrangement.

On the other hand, the connection setting processing unit of the node apparatus 3 on the receiving side may be arranged to include an identification information conversion setting processing unit for carrying out identification information conversion setting processing which makes it possible for the node apparatus 3 to receive the copy cell data transmitted from the transmission side node apparatus 2 as the original cell data transmitted from the transmission side node apparatus 2.

If the node apparatus 3 on the receiving side is arranged as described above, the node apparatus 3 can receive the cell data of the alternative connection 8 as cell data of the original connection 7. Thus, the communication connection can be made redundant.

Also in this case, the connection switching control unit 6 of the node apparatus 3 on the receiving side may be arranged to include a cell selection control unit which carries out switching from the original connection 7 to the alternative connection 8 by control of selecting the copy cell data while carries out switching from the alternative connection 8 to the original connection 7 by control of selecting the original cell data. If the node apparatus 3 on the receiving side is arranged as described above, switching between the original connection 7 and the alternative connection 8 can be effected in the node apparatus 3 on the receiving side, by the simple control that either the original cell data or the copy cell data is selected.

Accordingly, in the node apparatus 3 on the receiving side, switching between the original connection 7 and the alternative connection 8 can be effected in the node apparatus 3 on the receiving side, by the simple control that either the original cell data or the copy cell data is selected. Therefore, the node apparatus 3 on the transmitting side can also be simplified in its arrangement.

In other words, the above connection switching can be carried out in such a manner that the original connection and the alternative connection are brought to a state in which an identical user cell is allowable to be transmitted through the connections, and thereafter the setting of the original connection is released. In this way, switching between the original connection 7 and the alternative connection 8 can be effected by the simple control.

The node apparatus 2 and 3 may be connected with a connection test unit for testing the normality of the alternative connection 8. In this case, the alternative connection setting processing unit 5 may be arranged to include a test connection setting processing unit which carries out setting processing of test communication connection which connects the alternative connection 8 to the connection test unit.

If the node apparatus 2 and 3 are arranged as above, the normality of the alternative connection 8 can be examined without a line exclusively utilized for connecting the connection test unit to the node apparatus 2 or 3.

Also in this case, the connection switching control unit 6 may be arranged to include a test switching unit which carries out switching from the original connection 7 to the alternative connection 8 when the connection test unit confirms the normality of the alternative connection 8.

If the node apparatus is arranged as described above, the connection test unit confirms that the alternative connection 8 will work normally, and thereafter the test switching unit carries out switching from the original connection to the alternative connection. Therefore, it becomes possible to avoid undesirable operation that connection is switched from the original connection 7 to the alternative connection 8 in an abnormal state.

As described above, according to the above arrangement, it becomes possible to avoid an event that connection is switched from the original connection 7 to the alternative connection 8 in an abnormal state, leading to halting in service providing. Therefore, the reliability of the operation of connection switching will be remarkably improved. Further, the examination whether the alternative connection works satisfactorily or not is carried out in such a manner that the alternative connection and the connection test unit are connected to each other through test connection setting. Thus, the examination whether the alternative connection works satisfactorily or not will be carried out without providing a connection line exclusively utilized for the normality test. Accordingly, the switching operation from the original connection to the alternative connection becomes more reliable while the node apparatus is free from complicated construction.

The present connection oriented mode communication system 1 may further include a network management unit which issues a command of switching from the original connection 7 to the alternative connection 8 to the switching control means (connection switching control unit 6) when the network management unit receives a notice of normality confirmation of the alternative connection 8 from the connection test unit. With this arrangement, the command of switching can be generated to a number of node apparatus intensively, and hence the switching operation can be carried out with ease.

Further, the node apparatus may be arranged such that the connection test unit confirms the normality of each of a physical layer, an adaptation layer and an ATM layer of the alternative connection 8, and when normality of all layers is confirmed, the connection test switching unit 6 carries out switching from the original connection to the alternative connection. With this arrangement, the alternative connection 8 will become more reliable when it is utilized as a connection line for communication, with the result that it becomes possible to suppress the occurrence of service halting state deriving from the connection switching.

In this case, when the normality of each layer is confirmed in the node apparatus, the coordination of the alternative connection 8 may be further confirmed. With this arrangement, the alternative connection 8 will become more reliable when it is utilized as a connection line for communication, with the result that it becomes possible to suppress the occurrence of service halting state.

(B) Description of One Embodiment of the Present Invention

One embodiment of the present invention will hereinafter be described with reference to the attached drawings.

(B1) Description of First Embodiment

Figure 2:
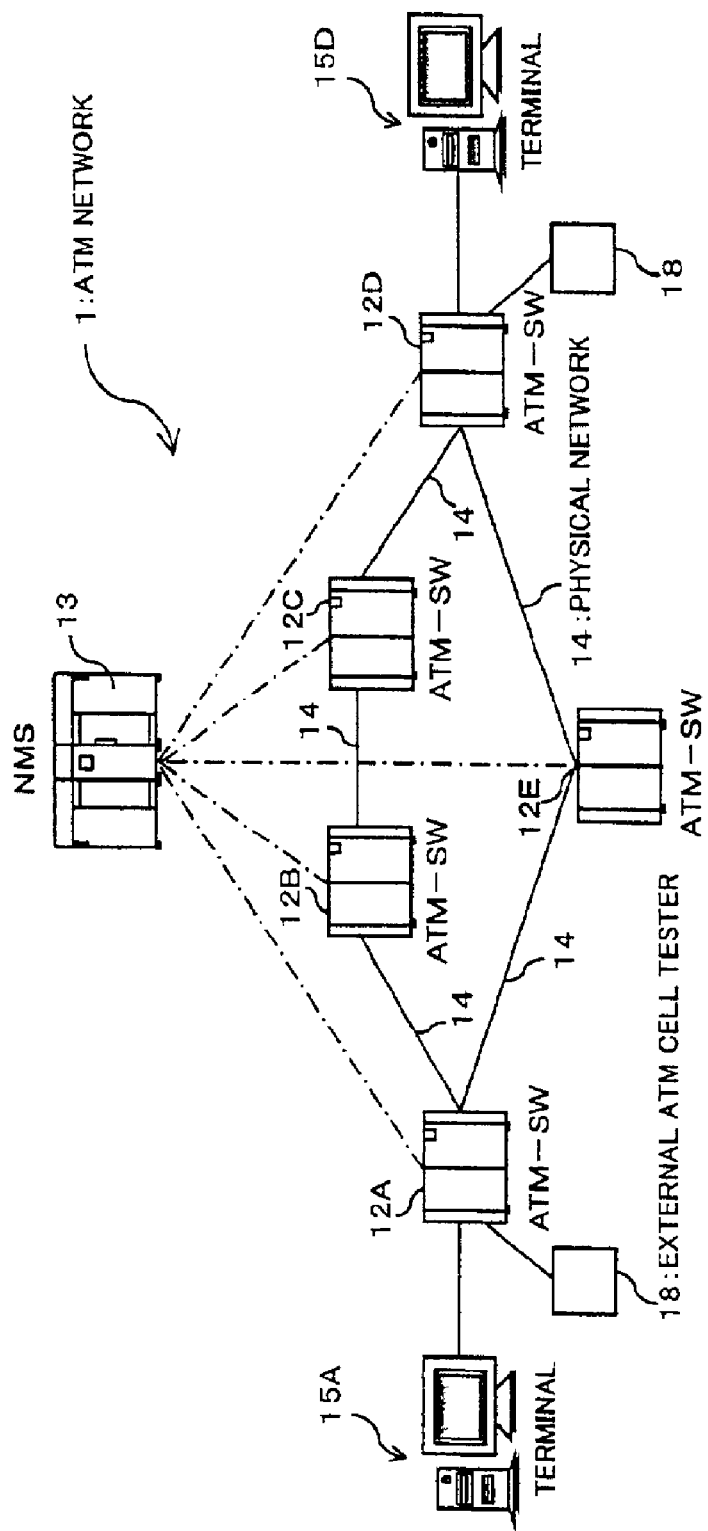
FIG. 2 is a block diagram showing an arrangement of an ATM network (connection oriented mode communication system) as an embodiment of the present invention.

FIG. 2 is a block diagram showing an arrangement of an ATM network (connection oriented mode communication system) as one embodiment of the present invention. As shown in FIG. 2, the ATM network 1 is arranged to include, for example, a plurality of ATM nodes 12A to 12E such as an ATM switcher (ATM-SW), and a network management system (NMS) 13 for collectively managing topology information of the ATM network so that each of the ATM nodes (hereinafter sometimes referred to as simply "node") 12A to 12E are subjected to call processing control.

In the arrangement illustrated in FIG. 2, the node 12A and node 12D are made to serve as a terminating station node in which subscriber's terminals 15A and 15D and an external ATM cell tester 18, which will be described later on, are accommodated. Conversely, the nodes 12B, 12C, 12E are made to serve as a relaying node for relaying a signal between the terminating nodes 12A and 12D. Although each of the nodes 12A to 12E are connected to one another through a single physical line 14 in FIG. 2, these nodes are actually connected to one another through a proper number of physical lines 14 so that a mesh-like connection network is constructed. Further, also in the embodiment of the present invention, the number of nodes constituting the ATM network is not limited to the number illustrated in FIG. 2 but various number of nodes may be included in the network.

Figure 3:
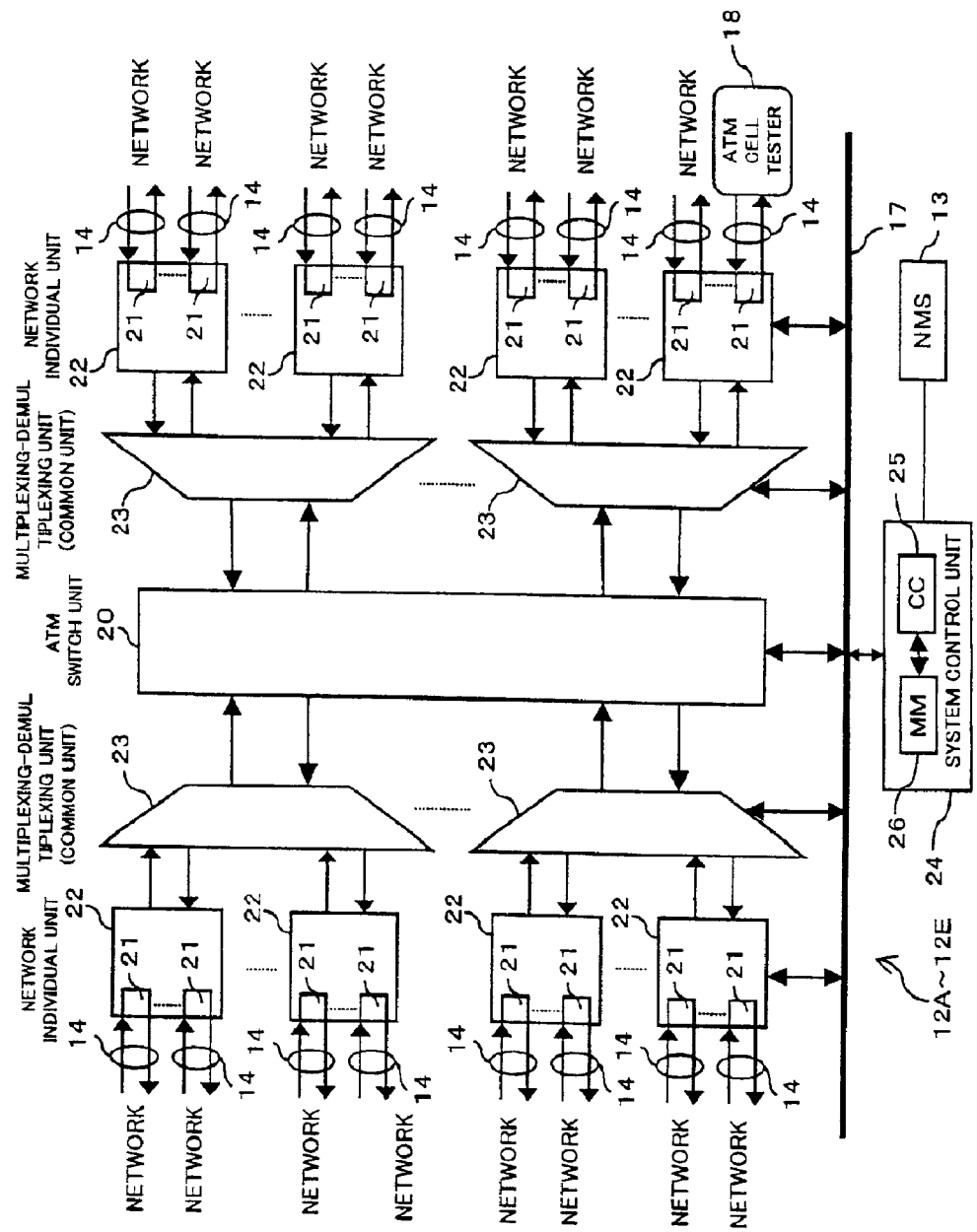
FIG. 3 is a block diagram showing in detail an arrangement of an ATM node (node apparatus) appearing in FIG. 2.

Each of the ATM nodes 12A to 12E of the present embodiment (hereinafter simply denoted as 'ATM node 12' if they need not be distinguished from one another) has an arrangement similar to that of the node shown in FIG. 26 in terms of a fundamental hardware arrangement (fundamental architecture). That is, as for example shown in FIG. 3, the node is arranged to include an ATM switch unit 20, a plurality of network individual unit 22 having one or more network interface (IF) units (IF cards) 21, a multiplexing-demultiplexing unit (common unit) 23 of which number corresponds to the mounted number of network individual units 22, and a system control unit 24 composed of a central controller (CC) 25 and a main memory (MM) 26. However, according to the arrangement, at least one external cell tester 18 is accommodated in the node through an arbitrary network individual unit 22, as shown in FIG. 3.

Also in the present embodiment, each of the network individual units 22 is arranged to cope with an accommodated line type such as the above-described cell relay service (CRS), the circuit emulation service (CES) or the like. Therefore, the network individual units 22 can serve as an interface between the node and the physical line 14 (hereinafter sometimes referred to as "line 14"). The fundamental function is to convert (input) a VPI/VCI, which is attached to the header of the input ATM cell supplied from the physical line 14 side through an up-link line, into an input internal channel identifier (I-ICID) inherent to its own node 12. Also, the network individual unit has a fundamental function to inversely convert the I-ICID of the input cell, which is supplied from the ATM switch unit 20 side through a down-link line, into an (output) VPI/VCI. This fundamental function for converting VPI/VCI and I-ICID from one to the other is referred to as VPI/VCI-ICID converting function.

Figure 4:
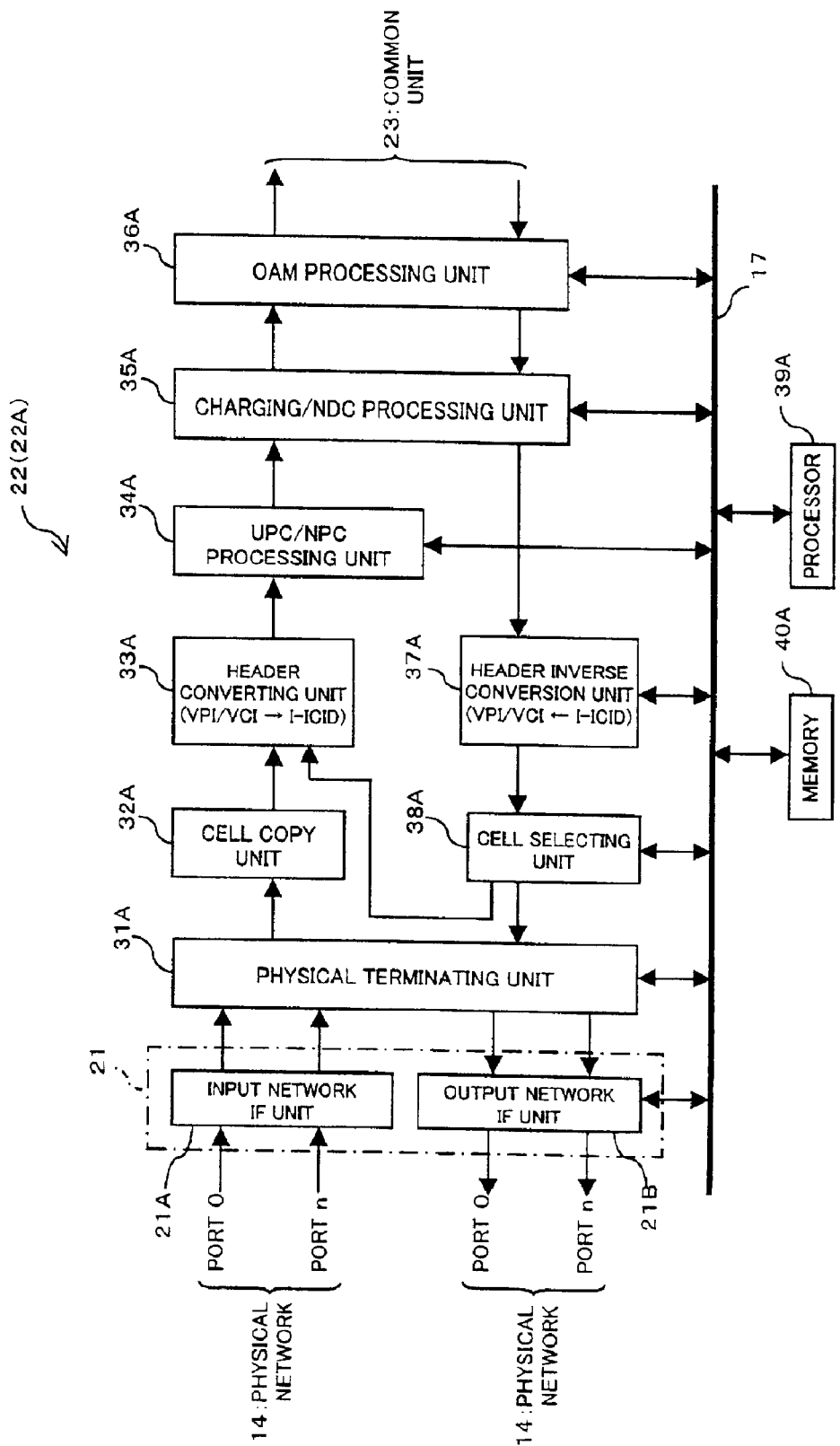
FIG. 4 is a block diagram showing in detail an arrangement of a network individual unit (for use in the CRS mode) appearing in FIG. 3.

If the network individual unit 22 is to be adapted to the CRS, as for example shown in FIG. 4, the above-described network IF unit 21 is provided with an input network interface (IF) unit 21A and an output network interface (IF) unit 21B. Further, the network individual unit 22 is arranged to include a physical terminating unit 31A, a cell copy unit 32A, a UPC/NPC processing unit 34A, a charging/NDC processing unit 35A, an OAM processing unit 36A, a header inverse-conversion unit 37A, a cell selecting unit 38A, a processor 39A and a memory 40A and so on. On the other hand, if the network individual unit 22 is to be adapted to the CES, as for example shown in FIG. 5, the network individual unit 22 is arranged to include a physical terminating unit 31B, an AAL1 terminating unit 31C, a cell copy unit 32B, a header converting unit 33B, an OAM processing unit 36B, a header inverse-conversion unit 37B, a cell selecting unit 38B, a processor 39B, a memory 40B and so on.

Each of the components constituting the network individual unit 22 will herein after be described in detail. In the following description, for convenience for explanation, the former network individual unit 22 (adapted to the CRS) is denoted as "network individual unit 22A" while the latter network individual unit 22 (adapted to the CES) is denoted as "network individual unit 22B". Further, if the network individual unit 22A and the network individual unit 22B need not be distinguished from each other, they are simply denoted as "network individual unit 22".

(1) Detail Description of Network Individual Unit 22A for CRS

As shown in FIG. 4, the network individual unit 22A includes the input network IF unit 21A and the output network IF unit 21B. The input network IF unit 21A is a unit arranged to accommodate one or more physical lines 14 (of which port number is 0 to n, n is an integer of 0 or greater than the same) on the input side (up-link side). The network individual unit 22A is also arranged to serve as an interface between the physical lines 14 and the network individual unit 22A. Also, the input network IF unit 21B accommodates one or more physical lines 14 (of which port number is 0 to n) on the output side (down-link side), and arranged to serve as an interface between the physical lines 14 and the network individual unit 22A.

The physical terminating unit 31A is a unit for extracting frame header information from an up-link SONET/SDH frame received from the up-link physical line 14, analyzing (terminating) the extracted information, and extracting an ATM cell from the frame. The physical terminating unit 31A also carries out mapping of the down-link ATM cell received from the side of the multiplexing-demultiplexing unit 23 on the SONET/SDH frame and exchanges a frame header to the down-link ATM cell. The cell copy unit 32A is a unit for copying a cell having a target VPI/VCI for the alternative connection and attaching (setting) the VPI/VCI for the alternative connection to the copied cell (copy cell).

However, as will be described later on, the cell copy unit 32A is arranged to halt temporarily when the process for confirming the normality of the alternative connection (signal quality test) is started in response to the reception of the test start message supplied from the NMS 13. The term "alternative connection" means a communication connection substitutive for a virtual (communication) connection (original connection or connection for providing communication service). According to the present embodiment, as will be described later on, the alternative connection is set so as to have a physically different route from that of the original connection. Thus, the alternative connection is set so as to be a virtual connection belonging to a physical link different from a physical link to which the original connection belongs.

The cell copy unit 32A carries out its operation based on an alternative connection assignment table 51 (hereinafter sometimes simply referred to as "assignment table 51" having combination information which contains, as for example concretely shown in FIG. 7A, reception target VPI/VCI information 51a, intra-unit output destination VPI/VCI (copy source VPI/VCI) information 51b corresponding to the reception target VPI/VCI information 51a, output destination VPI/VCI (copy source VPI/VCI) information 51c for the alternative connection, a switch flag 51d indicative of whether switching from the original connection to the alternative connection has been completed or not (e.g., as for example shown in FIG. 7B, digit 0/1 is made to represent the status of idling/working of the alternative connection), and so on.

That is, when the cell copy unit 32A receives a cell having the reception target VPI/VCI information 51a (e.g., 0/32) which has been entered in the assignment table 51, the cell copy unit 32A converts the VPI/VCI (=0/32) into the intra-unit output destination VPI/VCI (e.g., 50/100) for discriminating the intra-unit output destination connection based on the copy source VPI/VCI information 51b. Then, the cell copy unit 32A copies the cell for the output destination VPI/VCI (e.g., 51/100) for the alternative connection, based on the output destination VPI/VCI information 51c for the alternative connection.

The above-described alternative connection assignment table 51 is created when the central controller 25 in the system control unit 24 receives the alternative connection setting requisition from the NMS 13. The created assignment table 51 is transferred to the memory 40A provided within the network individual unit 22 through a bus line by means of data communication effected between the network individual unit 39A and the central controller 25.

Further, the header converting unit 33A is a unit for converting the VPI/VCI attached to the header of the input cell into the input internal channel identifier (I-ICID) based on the above-described VPI/VCI-ICID converting table. In this case, a copy cell supplied from the cell copy unit 32B, a copy source cell of that cell (original cell) or a cell returned from the cell selecting unit 38A and inputted thereto, which will be described later on, are all subjected to the conversion into the I-ICID code. Also, the VPI/VCI-ICID converting table is stored in the memory 40A, similarly to the alternative connection assignment table 51.

The UPC (Usage Parameter Control)/NPC (Network Parameter Control) processing unit 34A is a unit mainly serving for monitoring the number of input cells at every internal channel identifier (ICID) described above. If the UPC/NPC processing unit 34A detects an excessive number of input cells with respect to a previously reported band value (regular band value), then the UPC/NPC processing unit 34A discards the input cells of overflowing amount.

The charging/NDC (Network Data Collection) processing unit 35A is a unit for carrying out charging processing control, or counting the number of ATM cells passing through the unit at every ICID so as to create charging data or traffic data. The charging/NDC processing unit 35A also carries out collection control (NDC control) for collecting network data. The OAM processing unit 36A is a unit for distinguishing an OAM (Operation, Administration and Maintenance) cell so that an abnormal incident on the network in the ATM layer is detected and reported (abnormality management function) or error rate of a user information cell, cell loss rate, error cell inserting rate and so on are reported (performance management function).

The charging data, traffic data, network data, abnormality management information, performance management information, and so on obtained by the charging/NDC processing unit 35A and the OAM processing unit 36A are at any time collected by the central controller 25 by means of data communication through the bus line 17 connecting the central controller 25 in the system control unit 24 to the components of the network individual unit 12A to 12E, and collectively managed by the central controller 25.

The header inverse-conversion unit 37A is a unit for converting the I-ICID attached to the ATM cell supplied from the side of the multiplexing-demultiplexing unit 23 into the VPI/VCI in accordance with the above-mentioned VPI/VCI-ICID converting table. In this case, the I-ICID for the original connection and the I-ICID for the alternative connection are different from each other depending on the VPI/VCI-ICID conversion setting at the node 12 on the source side. However, in order to attain the redundancy of connection, both of the I-ICID and the I-ICID different from each other are to be converted into the same VPI/VCI (i.e., it is necessary for the VPI/VCI to have the same status before and after the connection switching).

To this end, the header inverse-conversion unit 37A of the present embodiment is arranged to have a function that the I-ICID for the original connection and the I-ICID for the alternative connection are converted into the same VPI/VCI based on a receiving side header inverse-conversion table 52 shown in FIG. 8, for example. That is, the header inverse-conversion unit 37A is arranged to convert a couple of I-ICID (100, 101) differing from each other into the same VPI/VCI (0/32), for example.

The cell selecting unit 38A is a unit for selecting (making the output valid) either of the down-link cell of the original connection or the down-link cell of the alternative connection when the cell selecting unit 38A receives a connection switching request (Bridge and Roll) message from the NMS 13, whereby switching between the original connection and the alternative connection is carried out. According to the present embodiment, the cell selecting unit 38A selects either of the cells (selection of the original connection or the alternative connection) depending on the setting of the enable bit 53 of the receiving side header inverse conversion table 52.

For example, in FIG. 8, if I-ICID=100 corresponds to the original connection and I-ICID=101 corresponds to the alternative connection, then the sell selecting unit 38A changes the current status that I-ICID=100 corresponds to the enable bit 53="1" into a new status that I-ICID=100 corresponds to the enable bit 53="0" and I-ICID=101 corresponds to the enable bit 53="1", whereby the alternative connection is selected and the connection mode is changed from the original connection to the alternative connection.

According to the present cell selecting unit 38A of the embodiment, the alternative connection (cell having the VPI/VCI of the alternative connection) is returned within the unit (returned to the header converting unit 33A) in response to the generation of a test start message (which will be described later on) from the NMS 13, and then the alternative connection is established so as to connect to an external ATM cell tester 18 (hereinafter simply referred to as "ATM cell tester 18").

That is, the cell returned from the cell selecting unit 38A to the header converting unit 33A is subjected to conversion in the header converting unit 33A so that it is converted into an I-ICID corresponding to the VPI/VCI of a virtual (communication) connection extending toward the network individual unit 22 to which the ATM cell tester 18 is connected. Thus, the cell is again switched to the connection to the ATM cell tester 18 by way of the ATM switching unit 20.

In this way, the ATM cell tester 18 can examine various traffic parameters (e.g., error rate of user information cell, cell loss rate, error cell inserting rate and so on) of the ATM cells flowing through the alternative connection, whereby it becomes possible to confirm the normality of the alternative connection (in terms of the physical layer, AAL1, ATM layer or the like)

In other words, the present ATM cell tester 18 is arranged to function as a connection test unit for testing the normality of the alternative connection. Further, according to the arrangement of the present embodiment, the central controller 25 does not effect switching from the original connection to the alternative connection until the ATM cell tester 18 confirms the normality (quality) of the alternative connection. The ATM cell tester (arrangement thereof or concrete operation of each layer normality confirmation) will be described later on more fully with reference to FIGS. 10 to 13.

Further, the processor 39A is connected to the system controller 24, and above-described components 21, 31A to 36A through the bus line 17 so as to be communicative with these components. Thus, the processor 39A can serve as a unit for controlling the operations of the components 21, 31A to 36A constituting the network individual unit 22A in accordance with the command generated from the central controller 25. The memory 40A is a unit for storing therein various data necessary for operating the processor 39A (including the above-described alternative connection assignment table 51, the receiving side header inverse-conversion table 52, the VPI/VCI-ICID converting table or the like) a program (firmware) and so on.

(2) Detailed Description of Network Individual Unit 22B for CES

Figure 5:
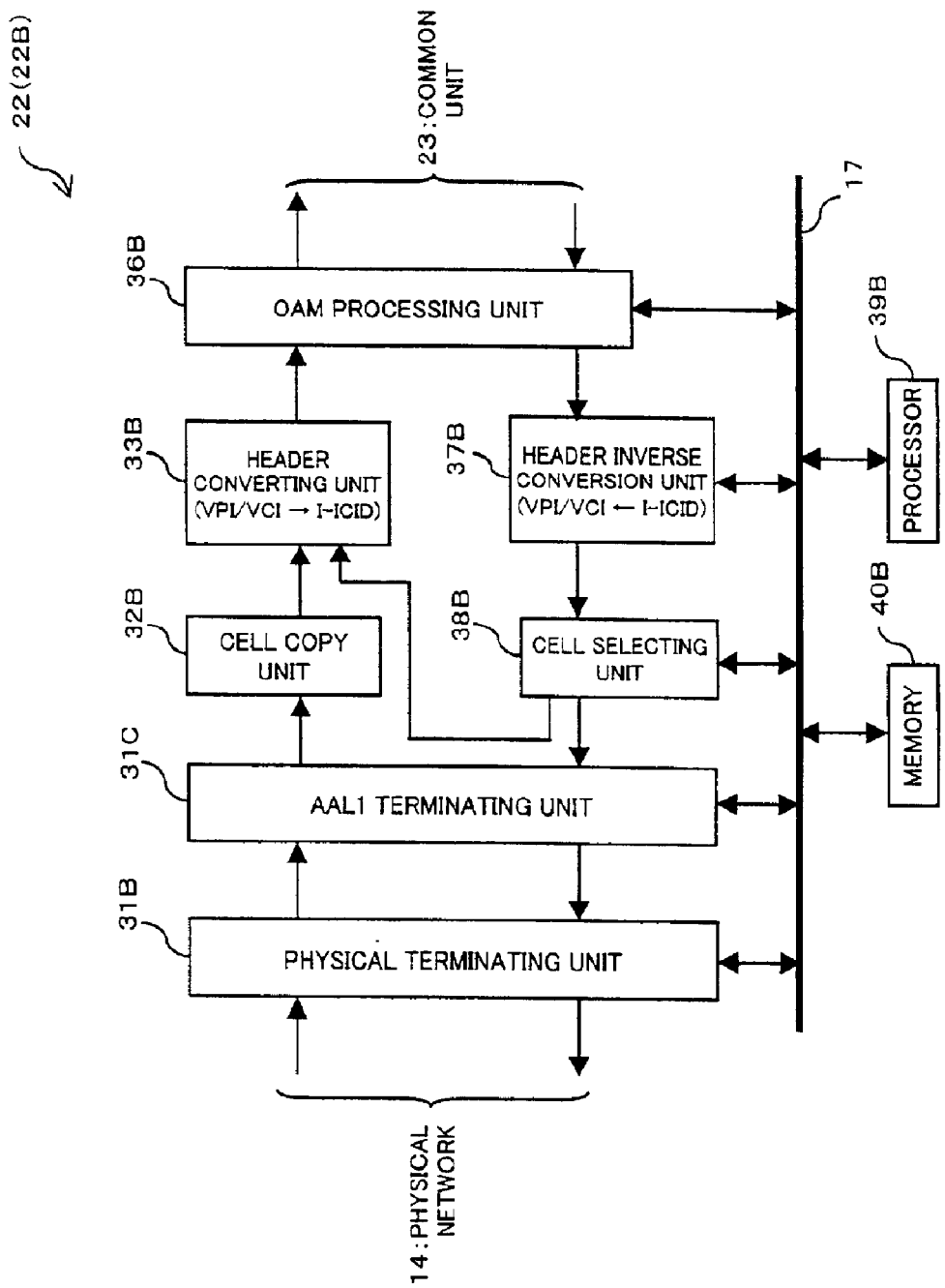
FIG. 5 is a block diagram showing in detail an arrangement of a network individual unit (for use in the CES mode) appearing in FIG. 3.

On the other hand, the network individual unit 22B shown in FIG. 5 includes a physical terminating unit 31B. The physical terminating unit 31B is a unit for terminating the up-link temporal frame signal supplied from the network 14, extracting data mapped on the frame signal, converting the extracted data into an ATM cell, converting a cell received from the side of the ATM switching unit 20 into data, carrying out mapping of the converted data on a down-link temporal frame signal to be outputted therefrom to the network 14.

The AAL1 (ATM Adaptation Layer 1) terminating unit 31C is a unit for extracting data from the cell at its information field (AAL1 payload portion) and carrying out data mapping onto the AAL1 payload portion. At this time, the AAL1 terminating unit 31C processes the header of the AAL1 payload portion [data unit regulating the protocol of segmentation and reassembling the cell (SAR-PDU; Segmentation and Reassembly Protocol Data Unit)] and carries out processing of segmentation and assembling of the user information, absorbs the fluctuation in delay of cell, detects the loss of cell and error cell insertion or the like, whereby even if service quality conditions of the transmitted cells are different from one another due to the media or the service attribute, such difference in service quality conditions can be absorbed.

When communication is effected in the CES, the present AAL1 terminating unit 31C allocates a fixed and identical VPI/VCI to all of the ATM cells which the AAL1 terminating unit 31C deals with. That is, when communication is effected in the CES, a fixed VPI/VCI is allocated at a unit of accommodated network 14 (i.e., unit of frame signal on the network 14).

Further, similarly to the cell copy unit 32A for the CRS, the cell copy unit 32B serves as a unit for copying a cell having the target VPI/VCI for the alternative connection in accordance with the alternative connection assignment table 51 stored in the memory 40B. Furthermore, the cell copy unit 32B attaches (sets) the VPI/VCI for the alternative connection to the copied cell (hereinafter sometimes called "copy cell"). Also in the cell copy unit 32B, when the process for confirming the normality of the alternative connection which will be described later on is started, the operation of the cell copy unit 32B is temporarily halted.

The header converting unit 33B is a unit for converting the VPI/VCI attached to the header of the input cell into the input internal channel identifier (I-ICID) in accordance with the VPI/VCI-ICID converting table held in the memory 40B. Also in this case, a copy cell or an original cell received from the cell copy unit 32B and a cell returned and inputted from the cell selecting unit 38B, which will be described later on, are converted into the input internal channel identifier (I-ICID).

Similarly to the OAM processing unit 36A, the OAM processing unit 36B serves as a unit for distinguishing an OAM cell so that an abnormal incident is detected and reported (abnormality management function) or error rate of a user information cell, cell loss rate, error cell inserting rate and so on are reported (performance management function). Also in this case, abnormality management information, performance management information, and so on obtained by the OAM processing unit 36B are at any time collected by the central controller 25 by means of data communication through the bus line 17 connecting the central controller 25 in the system control unit 24 to the components of the network individual unit 12A to 12E, and collectively managed by the central controller 25.

The header inverse-conversion unit 37B is a unit for converting the I-ICID attached to the ATM cell received from the side of the ATM switching unit 20 (the multiplexing-demultiplexing unit 23) into the VPI/VCI in accordance with the above-mentioned VPI/VCI-ICID converting table. The cell selecting unit 38B is a unit for selecting either of the down-link cell of the original connection having the VPI/VCI or the down-link cell of the alternative connection having the VPI/VCI in accordance with the switching flag 51d of the assignment table 51 when the cell selecting unit 38B receives a connection switching request (Bridge and Roll) message from the NMS 13 through the central controller 25, whereby switching between the original connection and the alternative connection is effected.

Similarly to the cell selecting unit 38A, the cell selecting unit 38B has a function that the alternative connection (cell having the VPI/VCI of the alternative connection) is returned within the unit (returned to the header converting unit 33B) in response to the generation of the test start message (which will be described later on) from the NMS 13, and then the alternative connection is established so as to connect to the external ATM cell tester 18.

That is, also in this case, the cell returned from the cell selecting unit 38B to the header converting unit 33B is subjected to conversion in the header converting unit 33B so that it is converted into an I-ICID corresponding to the VPI/VCI of a virtual connection extending toward the network individual unit 22 to which the ATM cell tester 18 is connected. Thus, the cell is switched to the connection to the ATM cell tester 18 by way of the ATM switching unit 20.

Further, the processor 39B is connected to the system controller 24, and above-described components 31B, 31C, 32B, 33B, 36B to 38B through the bus line 17 so as to be communicative with these components. Thus, the processor 39B can serve as a unit for controlling the operations of the components 31B, 31C, 32B, 33B, 36B to 38B constituting the network individual unit 22B in accordance with the command generated from the central controller 25. The memory 40B is a unit for storing therein various data necessary for operating the processor 39B (including the above-described alternative connection assignment table 51 and the VPI/VCI-ICID converting table) a program (firmware) and so on.

Figure 6:
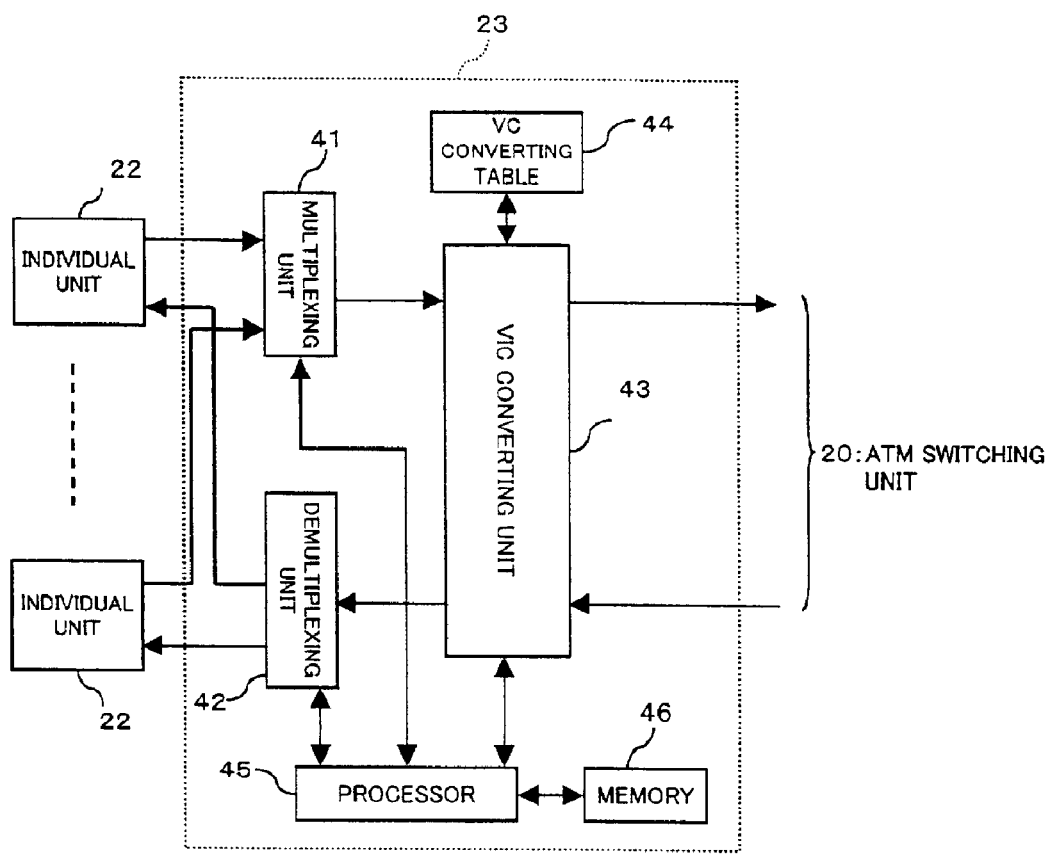
FIG. 6 is a block diagram showing in detail an arrangement of a multiplexing-demultiplexing unit (common unit) appearing in FIG. 3.

The multiplexing-demultiplexing unit 23 shown in FIG. 3 is a unit for accommodating the network individual units 22. The allowable number of network individual units 22 connected to the multiplexing-demultiplexing unit 23 is determined based on the signal transmission rate capable of being dealt with by the multiplexing-demultiplexing unit 23. The multiplexing-demultiplexing unit 23 carries out multiplexing and demultiplexing on an ATM cell transmitted and received between the network individual unit 22 and the ATM switching unit 20. As shown in FIG. 6, the main portion of the multiplexing-demultiplexing unit 23 is arranged to include a multiplexing unit 41, a demultiplexing unit 42, a VC (Virtual Channel) converting unit 43, a VC converting table 44, a processor 45, a memory 46 and so on.

The multiplexing unit 41 is a unit for effecting time-division multiplexing on a flow of an up-link input cells received from the plurality of network individual units 22 and outputting the multiplexed stream to the side of the ATM switching unit 20. The demultiplexing unit 42 is a unit for effecting demultiplexing operation on a flow of down-link cells which have undergone the switching in the ATM switching unit 20 and are received therefrom for each of the network individual units 22. Further, the demultiplexing unit 42 transmits each of the cells from the demultiplexing operation to the network individual units 22 as a destination.

The VC converting table 44 is a unit for storing the I-ICID which is determined in the central controller 25 and transferred from the same and combination information of a tag and a 0-ICID in a form of table. The combination information of the VC converting table 44 is determined in the central controller 25 and transferred from the same.

That is, the central controller 25 allocates an inherent I-ICID to the cell having the particularly received VPI/VCI at every network IF unit 21. Further, the central controller 25 determines the tag and the 0-ICID and sends the information thereof to the processor 45 in the multiplexing-demultiplexing unit 23. Then, the processor 45 sets the information in the VC converting table 44 and stores the information indicating that 0-ICID is set in the VC converting table 44, in the memory 46. Thus, the setting of virtual connection at the multiplexing-demultiplexing unit 23 is completed.

Further, the VC converting unit (Virtual Channel Converter) 43 exchanges (converts) the I-ICID contained in the header of the input cell supplied from the network individual unit 22 with 0-ICID in accordance with the combination information set in the VC converting table 44. Further, the VC converting unit 43 attaches tag information (hereinafter simply referred to as "tag") for routing (switching), converts the 0-ICID contained in the header of the input cell received from the ATM switch unit 20 into I-ICID, and deletes the tag for routing from the header.

The processor 45 is a unit for controlling the operation of each component 41 to 43, whereby the entire arrangement of the multiplexing-demultiplexing unit 23 is controlled. Similarly to the processors 39A and 39B of the network individual unit 22, the present processor 45 also is connected to the central controller 25 of the system control unit 24 so as to be communicative with the central controller 25. Thus, the processor 45 can carry out control of the multiplexing-demultiplexing unit 23 in accordance with the command generated from the central controller 25. Further, the memory 46 is a device for storing various data and program (firmware) necessary for operating the processor 45.

Also in the present embodiment, the ATM switching unit 20 shown in FIG. 3 is a unit for carrying out switching on the input cells in accordance with the tag attached to the cell inputted from each of the multiplexing-demultiplexing units 23 so that the cells are delivered to a predetermined multiplexing-demultiplexing unit 23. Also in this case, the ATM switching unit 20 repeats operation of selecting one from two digits, or "1" and "0" at every bit of the tag so that the operation of selection is effected independently.

Further, the central controller 25 of the system control unit 24 shown in FIG. 3 is arranged to serve as a unit for executing various settings and control on the network individual unit 22, the multiplexing-demultiplexing unit 23 and the ATM switching unit 20, whereby call processing control (setting a virtual connection and controlling the same) is effected. The main memory 26 is a unit for storing various data and program (firmware) necessary for the central controller 25 to effect the call processing control.

However, as will be understood from the above description, the central controller 25 of the present embodiment has a function in addition to the ordinary call processing control. That is, the central controller 25 has a function that when the central controller 25 receives a setting request of the alternative connection from the NMS 13, the central controller 25 creates the VPI/VCI-ICID converting table information for the alternative connection (I-ICID, tag, 0-ICID), transfers the created information to the common unit 23, creates information of the assignment table 51 and the receiving side header inverse-conversion table 52 and transfers the same to the network individual unit 22, whereby the alternative connection is set for the network individual unit 22 and the common unit 23. The central controller 25 also has a function that the switching flag of the assignment table 51 or the setting information of the enable bit of the receiving side header inverse-conversion table 52 is transferred to the network individual unit 22, whereby switching between the original connection and the alternative connection is effected. Furthermore, the central controller 25 has a function for setting returning connection to the ATM cell tester 18.

Figure 9:
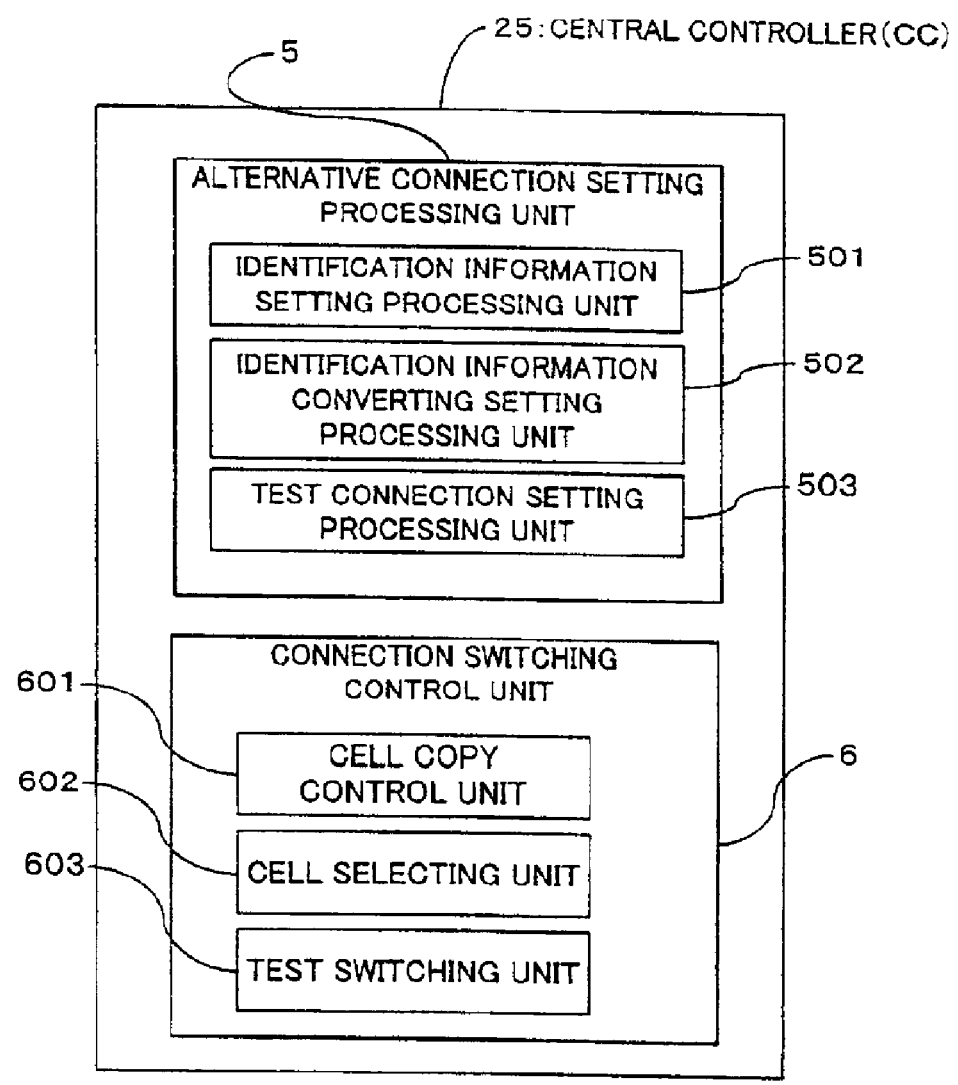
FIG. 9 is a diagram showing in a block form the function of a central controller appearing in FIG. 3.

That is, as for example shown in FIG. 9, the central controller 25 of the present embodiment has a function as an alternative connection setting processing unit 5 that a virtual connection (second communication connection) having a route physically different from that of the original connection (first communication connection) is set as an alternative connection substitutive for the original connection (hereinafter sometimes referred to as a detouring connection). Also, the central controller 25 has a function as a connection switching control unit 6 for controlling switching between the original connection and the detouring connection. This fact can be regarded as that these units 5 and 6 have the following components.

Alternative Connection Setting Processing Unit 5

(1) An identification information setting processing unit 501 for carrying out processing for setting the identification information (VPI/VCI) about the detouring connection to a copy cell created by the cell copy unit 32A (32B) when the own node 12 is made to serve as a transmitting side node.

(2) An identification information conversion setting processing unit 502 for carrying out identification information conversion setting processing on the header inverse-conversion unit 37A (37B) so that the copy cell (received from the detouring connection) from a transmitting side node 12 is received as an original cell (received from the original connection) from the last-named transmitting side node 12 when the own node 12 is made to serve as a receiving side node.

(3) A test connection setting processing unit 503 for carrying out setting processing of test connection which connects the detouring connection to the ATM cell tester 18.

Connection Switching Control Unit 6

(1) A cell copy control unit 601 for making invalid the original cell having attached with the VPI/VCI of the original connection to be sent to a receiving side node 12 and for making valid the copy cell created by the cell copy unit 32A (32B) as a transmitting cell to the last-named receiving side node 12, whereby switching from the original connection to the detouring connection is effected, and also for making valid the original cell to the receiving node 12 so that switching (turning back) from the detouring connection to the original connection is effected, when the own node 12 is made to serve as a transmitting side node.

(2) A cell selecting control unit 602 for controlling the cell selecting unit 38A (38B) so that the copy cell data from a transmitting side node 12 is selected, whereby switching from the original connection to the detouring connection is effected, and also for controlling the cell selecting unit 38A (38B) so that the original cell data from the last-named transmitting side node 12 is selected, whereby switching (turning back) from the detouring connection to the original connection is effected, when the own node 12 is made to serve as a receiving side node.

(3) A test switching unit 603 for effecting switching from the original connection to the detouring connection when the normality of the detouring connection is confirmed by the ATM cell tester 18.

An example of the above-introduced ATM cell tester 18 will hereinafter be described.

Figure 10:
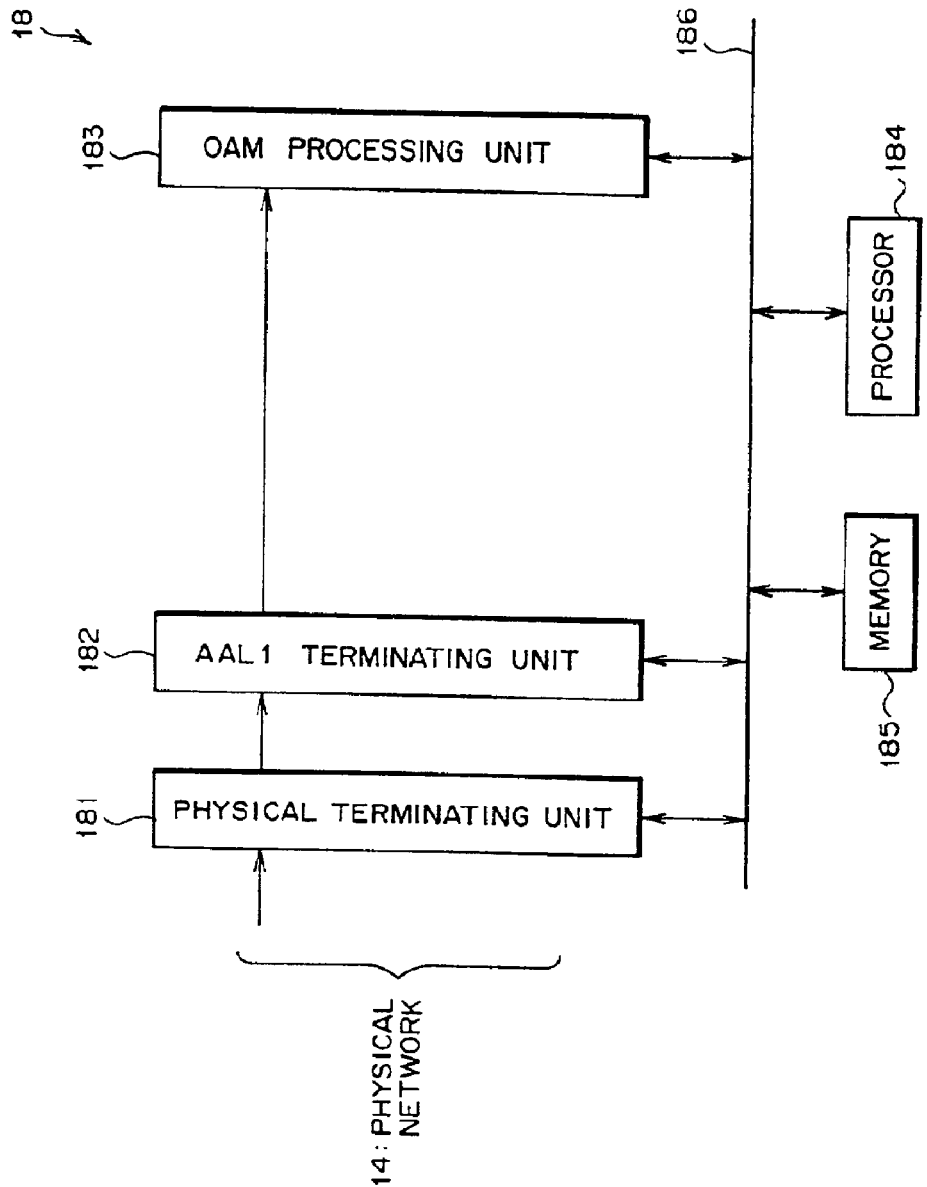
FIG. 10 is a block diagram showing in detail an arrangement of an external ATM cell tester appearing in FIG. 2.

FIG. 10 is a block diagram showing in detail one example of an arrangement of the ATM cell tester 18. As shown in FIG. 10, the ATM cell tester 18 is arranged to include a physical terminating unit 181, an AAL1 terminating unit 182, an OAM processing unit 183, a processor 184, a memory 185, and a bus line 186.

The physical terminating unit 181 is a unit provided with an IPPM (Internal Path Performance Monitoring) function in which a cell (copy cell) inputted owing to the connection returning connection setting is terminated as a test cell so that the physical layer of the detouring connection is confirmed in its normality. The physical terminating unit 181 is arranged to check on items (parameter) as for example shown in FIG. 11.

In the notations entered in FIG. 11, "CV (Coding Violation)" represents a parameter indicative of the presence or absence of bit error, "ES (Error Second)" a parameter indicative of the presence or absence of bit error or the number of detected alarm indication signal (AiS), "SES (Severely Error Second)" a parameter indicative of the number of detected errors larger than that of the parameter "ES", "SAS [SEF (Severely Error Framing)/Ais Second]" a parameter indicative of the number of detected errors of the signal frame or errors of the AiS, "AiSS" a parameter indicative of the number of detected errors of the AiS, and "UASP (Un-Available Second)" is a parameter indicative of the detected number of useless indications. All of these parameters are known as a standard of ATM (parameters utilized for confirming the normality of the physical layer).

The AAL1 terminating unit 182 is a unit having an AAL1 terminating function for confirming the normality of the AAL1 of the test cell. For example, the AAL1 terminating unit 182 is capable of confirming the normality of AAL1 by checking the AAL1-SN (Sequence Number).

Figure 12:
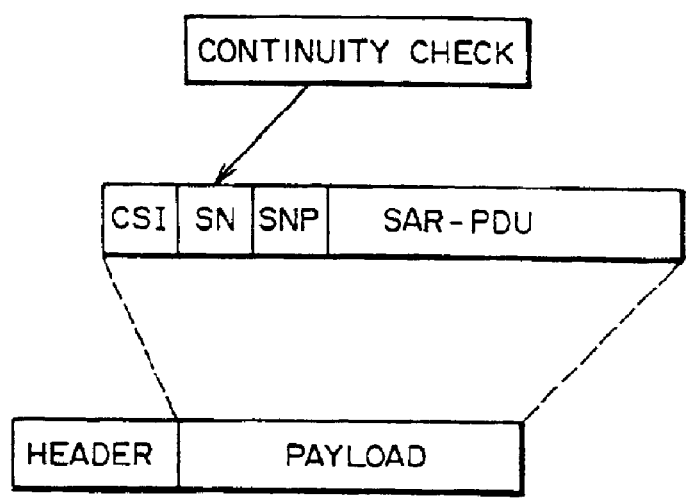
FIG. 12 is an ATM cell format diagram for explaining AAL1 normality confirmation of the alternative connection at an AAL1 terminating unit appearing in FIG. 10.
Figure 13:
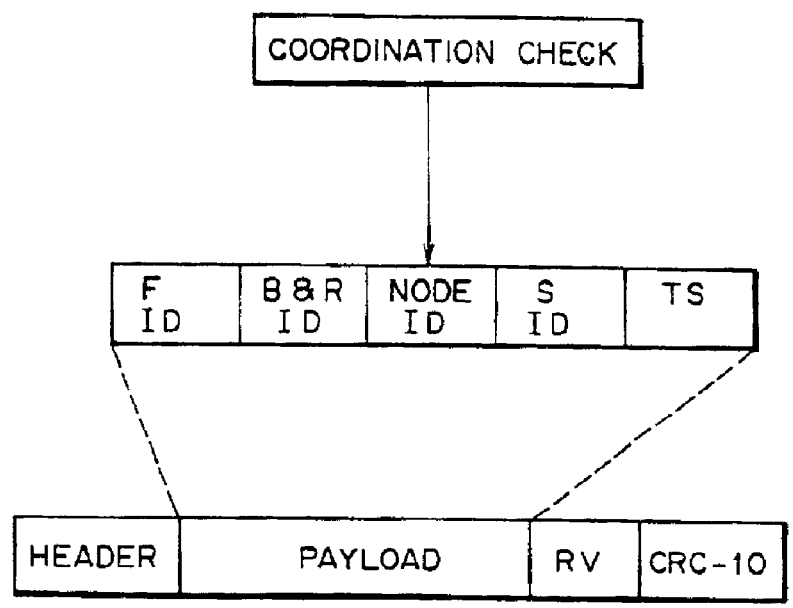
FIG. 13 is an ATM cell format diagram for explaining ATM layer normality confirmation carried out in an OAM processing unit appearing in FIG. 10.

The checking of the AAL1-SN is carried out by checking the continuity of the sequence numbers SN (three bits) attached to the payload portion of the ATM which is composed of the header portion (five bytes) and the payload portion (48 bytes), as shown in FIG. 12. That is, the ATM cell is attached with a sequence number which is incremented at every transmission of the cell on the cell transmitting side. Therefore, it becomes possible on the cell receiving side to determine whether or not a part of the cell flow is missed or a foreign cell is erroneously inserted into the cell flow, by examining the sequence number SN. In other words, the normality of the ATM adaptation layer can be confirmed.

As for notations other than the sequence number, SN in FIG. 12, "CSI" is a Convergence Sublayer (CS) indication field (one bit) for indicating whether the CS function is supported or not and/or indicating a clock correcting value utilized when a cell having timing information is missed, and "SNP" is an indication for indicating a sequence number protection field. In more concretely, the sequence number protection field protects the sequence number SN by a three-bit CRC (Cyclic Redundancy Check) control bit (three bits). A total seven-bit deriving from adding the CRC control bit, the above "CSI" (one bit) and the sequence number SN (three bits) together is protected by an even-number parity check. "SAR-PDU" is already mentioned.

The OAM processing unit 183 is a unit having a function for confirming the normality of the ATM layer of the detouring connection by checking the contents of the OAM cell when the format of the OAM cell is utilized as the above-described test cell. According to the present embodiment, as for example shown in FIG. 13, a new OAM cell is defined so that the cell includes a reserve region (RV) and a CRC control bit (CRC-10) of ten bits, in addition to the header and the payload portion of an ordinary cell. Then, the payload portion is made to have a function ID (FID), a bridge and roll (B&R) ID, a node ID (Node ID), a sequence ID (SID) and a time stamp (TS) inserted, whereby error check can be effected on the payload portion by using the CRC control bit of ten bits.

In this case, the node ID (identifier) is created in such a manner that, if the corresponding connection is to be established by way of the nodes 12A, 12B, 12C, and 12D, as for example, of the ATM network 2 shown in FIG. 2, a fragment of ID bit is added together each time the test cell (OAM cell) passes through the nodes 12A, 12B, 12C, and 12D, and the fragments of the ID bits constitute the node ID.

Therefore, if the node ID is subjected to examination at the final stage of transmission, or on the receiving side, it is possible to check whether the connection (detouring connection) has been well coordinated or not (i.e., whether the connection to be established has been established with no problem or not) As a result, the alternative connection for providing connection service can be utilized more reliably, with the result that the service halting state can be more positively suppressed upon switching connection.

Now the above-introduced processor 184 will be described. The processor 184 is a unit for intensively controlling the operation of the physical terminating unit 181, the AAL1 terminating unit 182 and the OAM processing unit 183 through the bus line 186. To this end, the processor 184 collects information indicative of the result of normality confirmation of the physical layer, the AAL layer, and the ATM layer (including coordination check) by using the components 181 to 183. If the normality of all layers is confirmed, the processor 184 issues a message indicative of that the normality of the alternative connection has been confirmed (test OK message). If the normality of any of the layers has not been confirmed, the processor 184 issues an abnormal message (connection failure; test NG message).

As will be described later on, the messages (test OK/NG) are reported to the NMS 13 by way of the network individual unit 22 on the receiving side of the detouring connection. Thereafter, when a switching command (message) for instructing on switching from the original connection to the detouring connection from the NMS 13 to the node 12 on the receiving side of the detouring connection [central controller 25 (test switching unit 603)], then the switching from the original connection to the detouring connection is effected. A software and various setting data necessary for operating the processor 183 are stored in the memory 185. Further, the memory 185 has data indicative of the result of normality confirmation collected by the processor 183 stored therein.

That is, the above-described physical terminating unit 181, the AAL1 terminating unit 182, the OAM processing unit 183, the processor 184 and the memory 185 constitute layer normality confirming means for confirming the normality of all of the physical layer, the adaptation layer and the ATM layer of the detouring layer (including the coordination check of the detouring connection). Further, the layer normality confirming means is arranged so that when the test switching unit 603 confirms the normality of all layers, the original connection is switched to the detouring connection.

If the above test cell is arranged based on the OAM cell format, it is possible to distinguish the test cell from a user cell depending on the payload type (PT) within the cell header. Of course, if the test cell is defined in an original manner, the test cell can be distinguished from the user cell based on the definition. Although the present ATM cell tester 18 is arranged as an externally provided unit with respect to the node 12 in the present embodiment, the ATM cell tester 18 may be mounted as an IF card (quality confirming card) similarly to the network IF unit 21, for example.

Operation in the ATM network 1 (method of setting connection) of the present embodiment arranged as described above will hereinafter be described in detail.

Figure 14:
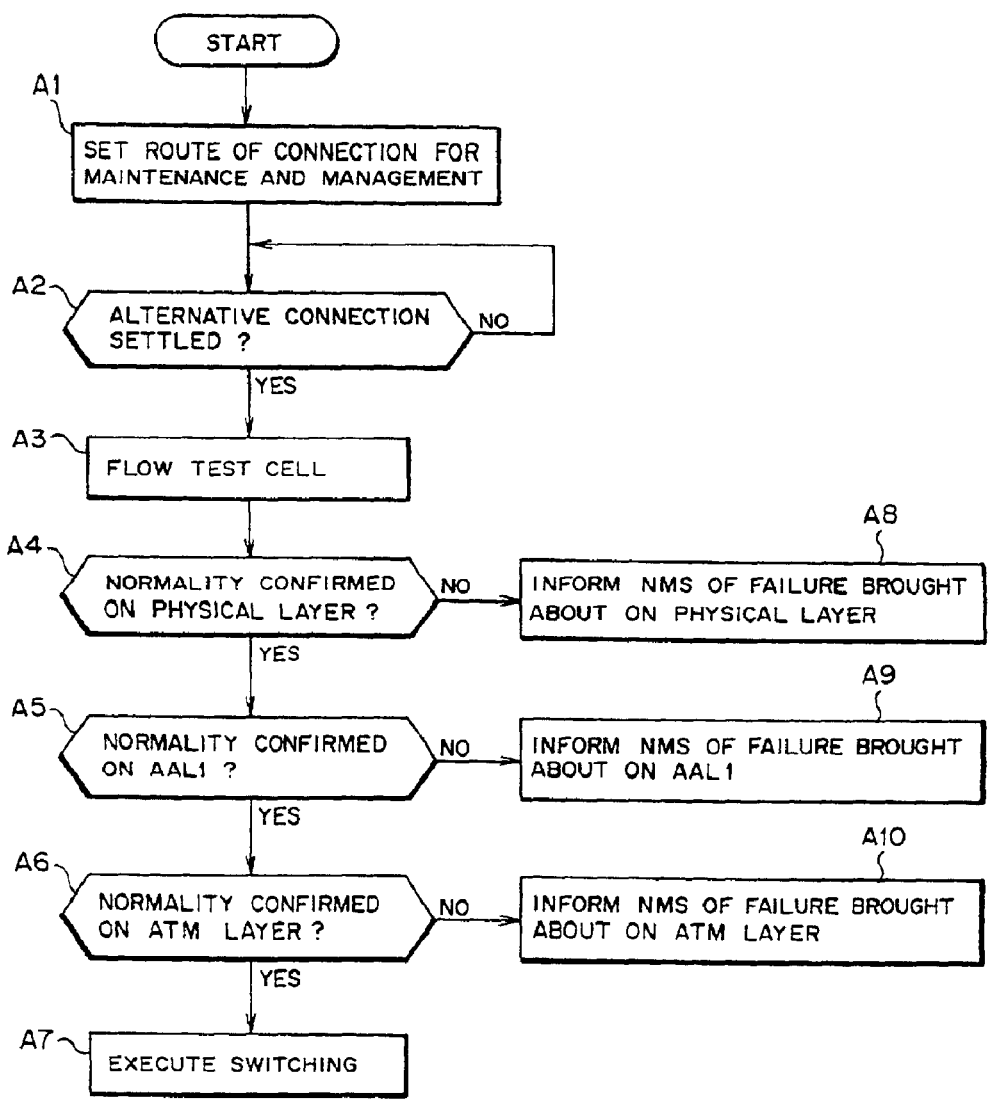
FIGS. 14 and 15 are a flowchart for explaining an operation of the ATM network (method of setting connection) according to the embodiment of the present invention.

Initially, the overall operation (fundamental operation) in the ATM network will 1 will be described with reference to a flowchart shown in FIG. 14 (steps A1 to A10). Initially, NMS 13 tries to set a detouring (alternative) connection so that the detouring connection has a route (e.g., node 12A→node 12E→node 12D in FIG. 2) different from the route (e.g., node 12A→node 12B→node 12C→node 12D in FIG. 2) of the physical link in which the original connection under use of connection service is settled (step A1).

When the step of setting the detouring connection is completed (YES route at step A2), the node 12 on the transmitting side of the original connection starts copying of the cell and sends the copy cell as a test cell to the receiving side node 12 through the detouring connection (step A3). This test cell is supplied to the ATM cell tester 18 owing to the returning connection setting which is made in response to the command from the NMS 13 through the receiving side node 12 of the detouring connection.

The ATM cell tester 18 confirms the normality of the physical layer, the AAL1 layer and ATM layer based on the received test cell as described above (steps A4 to A6). The result of confirmation is reported to the NMS 13. If normality of all the layer (including the above-described coordination of the detouring connection) is confirmed (YES routes for all of steps A4 to A6), the NMS 13 sends a switching command to the transmitting side node and the receiving side node of the detouring connection, whereby switching from the original connection to the detouring connection is executed (step A7).

Conversely, if a trouble (link failure) is detected in any of the layers (NO route at any of steps A4 to A6) this fact is reported to the NMS 13 (step A8, A9 or A10), and the NMS 13 cancels the setting of the detouring connection and tries to set another detouring connection in a manner similar to the above-described one.

Next, the method of setting a connection according to the present embodiment will hereinafter be described in more detail based on the above-described fundamental procedure.

Figure 15:
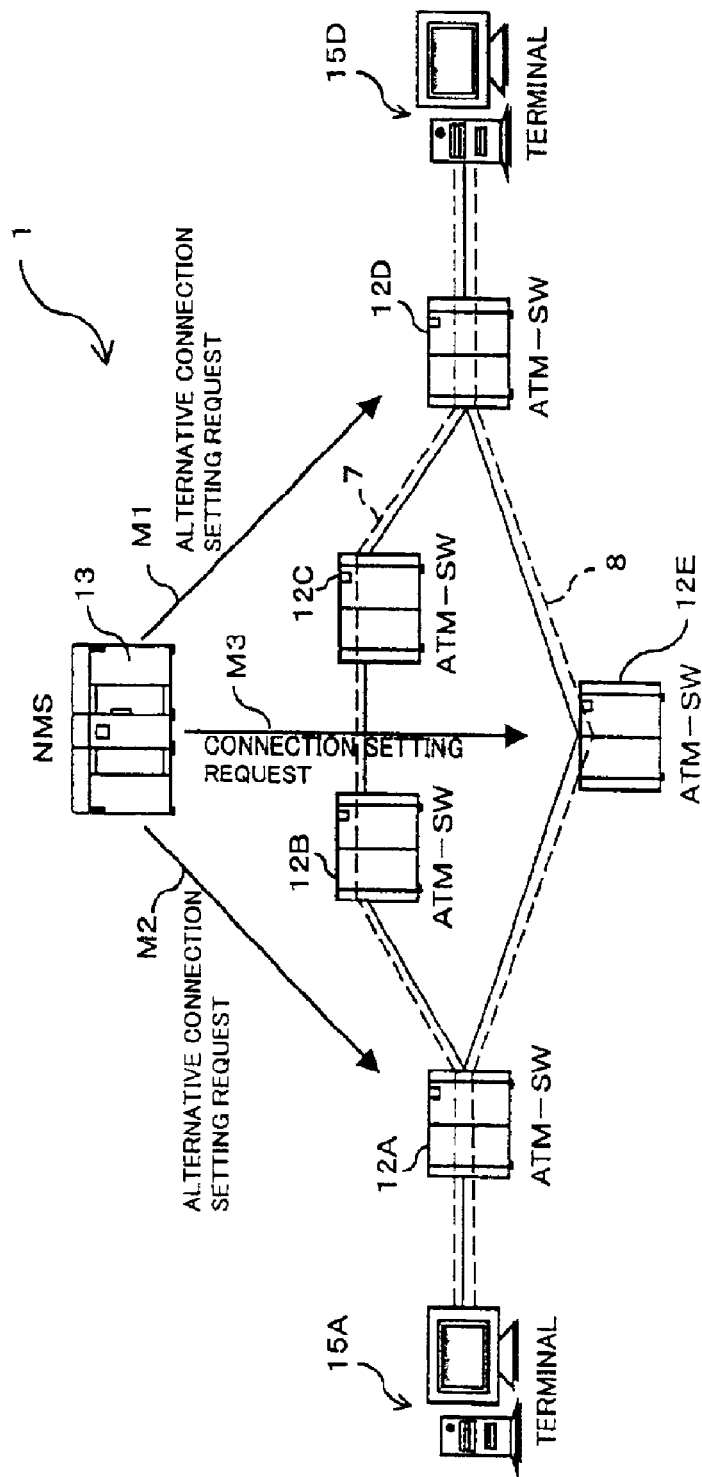

FIG. 15 is a diagram for explaining an operation of the ATM network according to the above-described embodiment. Initially, as shown in FIG. 15, an original connection (PVC) 7 is established as the physical line 14 settled between subscriber's terminals 15A and 15D by way of the node 12A→the node 12B→the node 12C→the node 12D. Now it is assumed that the facilities of the connection are to be subjected to maintenance or moved to another place, with the result that the connection 7 is to be recovered by newly setting a connection 8 as a detouring connection so that it has another route of 12A→the node 12E→the node 12D. The original connection 7 may be set in a conventional manner (connection setting step).

At this time, the NMS 13 issues PVC Setting Request Message M1 for alternative connection transmitting side to the node 12A, PVC Setting Request Message M2 for alternative connection receiving side to the node 12D, and ordinary PVC Setting Request Message M3 (for alternative connection relaying station) to the node 12E. These PVC Setting Request Messages M1 to M3 have settled therein at least VPI/VCI information for the alternative connection 8. These pieces of information are accepted by the central controller 25 of the system control unit 24 of each of the nodes 12A, 12D and 12E.

In this way, the central controller 25 of the transmitting side 12A (alternative connection setting processing unit 5) initially determines an I-ICID in accordance with the VPI/VCI for the alternative connection 8 reported by means of PVC Setting Request Message M1, and then determines a tag for routing operation and 0-ICID in accordance with the I-ICID.

Then, the central controller 25 of the transmitting side 12A (hereinafter sometimes referred to as central controller 25A) sends data indicative of the assignment relationship between the determined VPI/VCI and the I-ICID, and data indicative of a preserved band (user's reported band) of the PVC reported by means of PVC Setting Request Message M1, to the processor 39A (39B) of the network individual unit 22 on the input/output side to which the original connection 7 is set.

The processor 39A (39B) stores the data indicative of the assignment relationship between the determined VPI/VCI and the I-ICID into the memory 40A as a VPI/VCI-ICID converting table, and carries out header conversion setting for the header converting unit 33A (33B) and the header inverse-conversion unit 37A (37B), based on the VPI/VCI-ICID converting table. Further, the processor 39A (39B) carries out setting for reserving the reported band for the UPC/NPC processing unit 34A (ALL1 terminating unit 31C).

On the other hand, the central controller 25 (the identification information setting processing unit 501 of the alternative connection setting processing unit 5) creates information (51a to 51c) for the alternative connection assignment table 51 shown in FIGS. 7A and 7B in accordance with the contents of PVC Setting Request Message M1. Then, the central controller 25 sends the created information to the processor 39A (39B) of the network individual unit 22 on the input/output side to which the original connection 7 is set.

The processor 39A (39B) reserves the received information in the memory 40B as the alternative connection assignment table 51, and carries out setting for the cell copy unit 32A (32B) (VPI/VCI conversion setting of the copy cell for the alternative connection) based on the assignment table 51.

Also at this time, the central controller 25A has sent the I-ICID for the determined alternative connection and the tag (TAG) and assignment relation (combination information) with the 0-ICID to the processor 45 of the target multiplexing-demultiplexing unit 23 on the input/output side. The processor 45 enters the received combination information in the VC converting table 44 so that the VC converting setting is effected for the alternative connection within the multiplexing-demultiplexing unit 23 on the input/output side.

Figure 16:
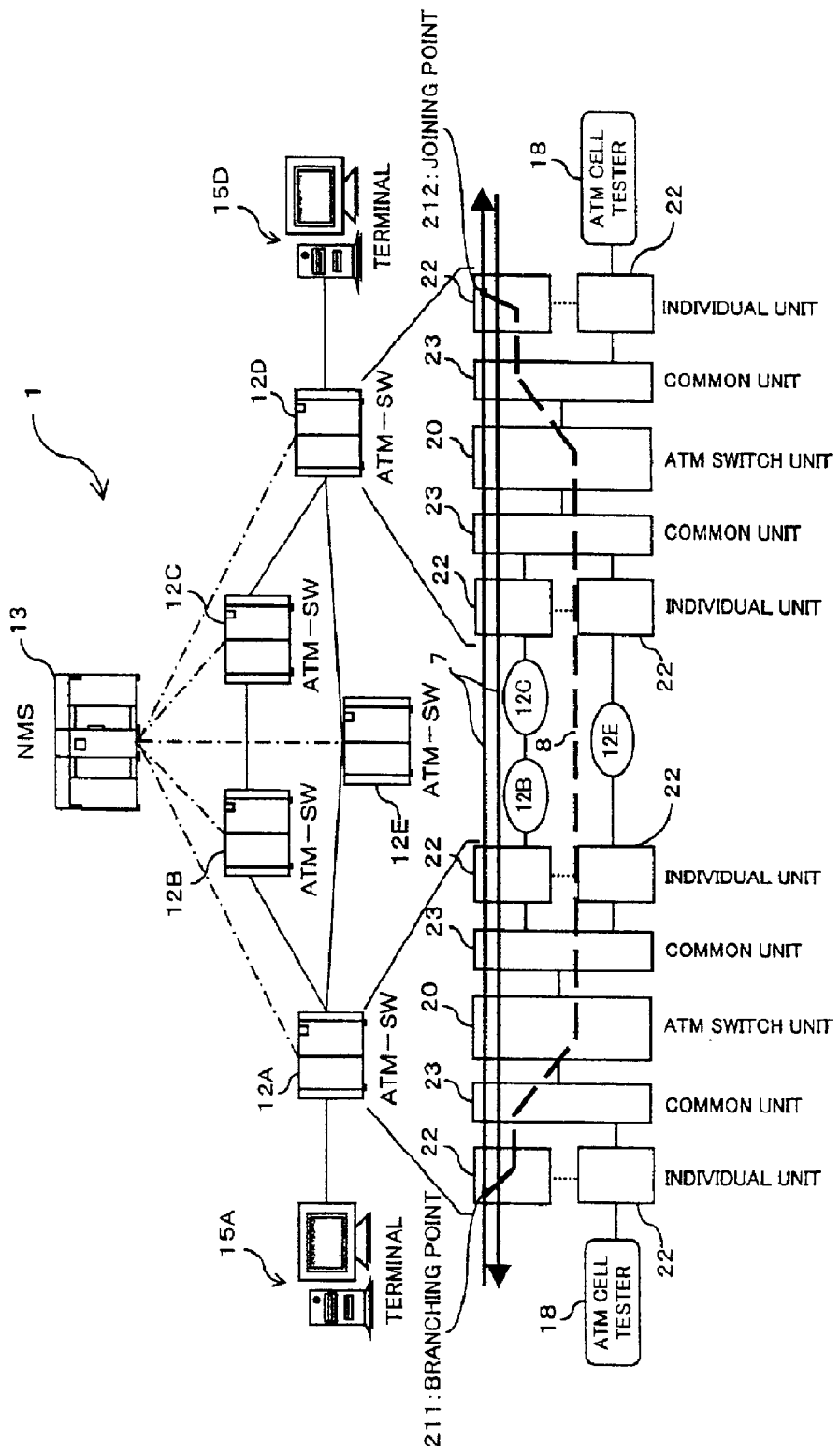
FIG. 16 is a diagram for explaining an operation of the ATM network (method of setting an alternative connection for one-way communication) according to the embodiment of the present invention.
Figure 17:
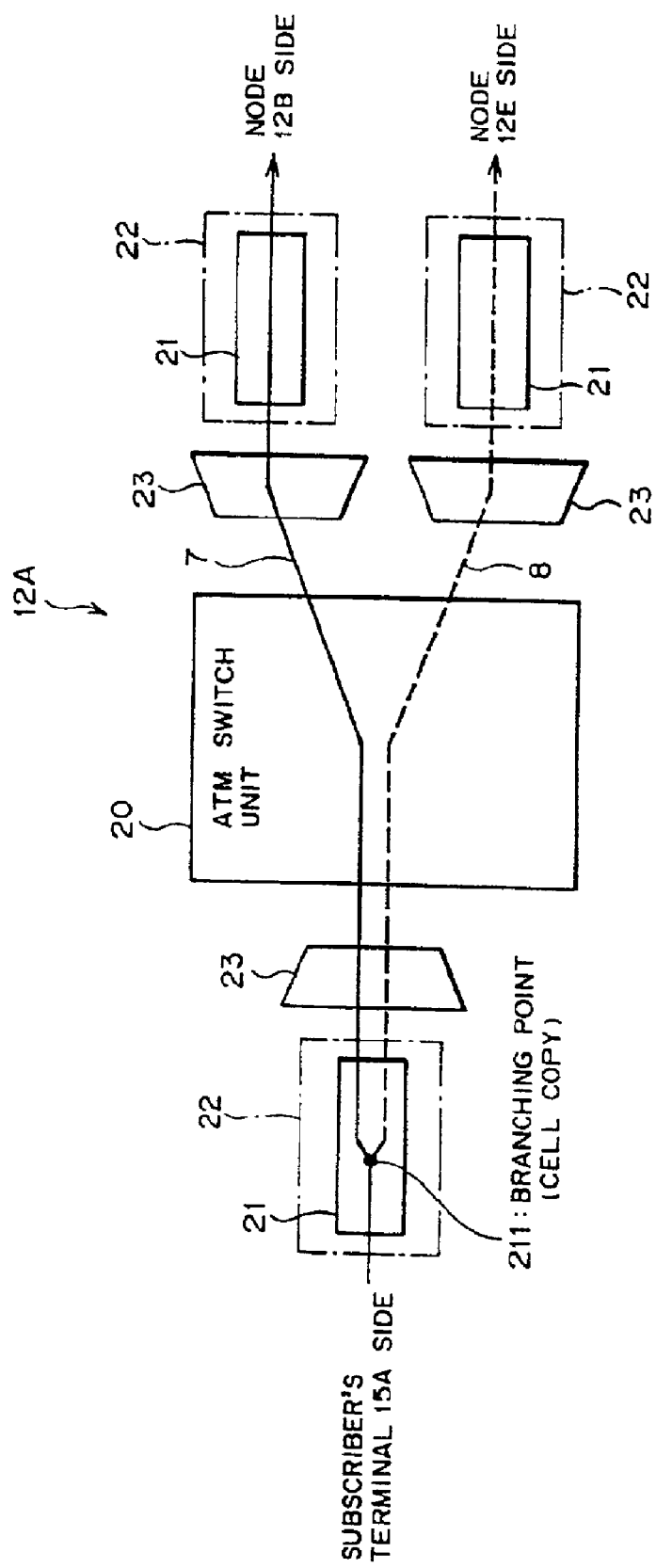
FIG. 17 is a diagram for explaining an operation of the ATM network (method of setting the alternative connection for one-way communication effected at the transmitting side node) according to the embodiment of the present invention.

With the above setting processing, as for example shown in FIG. 17, the node 12A comes to have at the network individual unit 22 (network IF unit 21) on the subscriber's terminal 15A therein a branching point 211 which branches the line into the original connection 7 and the alternative connection 8. Thus, the alternative connection 8 having a route extending from the subscriber's terminal 15A to the subscriber's terminal 15D is established as shown with a broken line in FIG. 16.

As described above, according to the present embodiment, the transmitting cell for the receiving side node 15D attached with the VPI-VCI of the original connection 7 is copied and the VPI/VCI for the alternative connection 8 is settled, whereby both of the original cell of the original connection 7 and the copy cell for the alternative connection 8 are brought to a standby mode for transmission to the receiving side node 15D. With this simple arrangement, a redundant virtual connection can be realized.

Also in the node 12D having received PVC Setting Request Message M2 for the alternative connection receiving from the NMS 13, the central controller 25 (hereinafter sometimes denoted as central processor 25D) determines I-ICID in accordance with the VPI/VCI as a receiving target for the alternative connection reported by PVC Setting Request Message M2, and also determines a tag for routing and the 0-ICID so as to correspond to the I-ICID.

Then, the central controller 25D sends data indicative of the assignment relationship between the determined VPI/VCI for the alternative connection and the I-ICID and data indicative of the reserved band (band reported by the user) of the PVC reported by means of PVC Setting Request Message M2 to the processor 39A (39B).

The processor 39A (39B) stores the data indicative of the assignment relationship between the determined VPI/VCI and the I-ICID into the memory 40A as a VPI/VCI-ICID converting table, and carries out header conversion setting for the header converting unit 33A (33B) and the header inverse-conversion unit 37A (37B), based on the VPI/VCI-ICID converting table. Further, the processor 39A (39B) carries out setting for reserving the reported band for the UPC/NPC processing unit 34A (ALL1 terminating unit 31C).

On the other hand, the central controller 25D (the identification information conversion setting processing unit 502 of the alternative connection setting processing unit 5) creates information (I-ICID, VPI/VCI) for the receiving side header inverse conversion table 52 shown in FIG. 8 in accordance with the contents of PVC Setting Request Message M2. Then, the central controller 25 sends the created information to the processor 39A (39B) of the network individual unit 22 on the input/output side.

The processor 39A (39B) reserves the received information in the memory 40B as the receiving side header inverse conversion table 52, and carries out setting for the header inverse-conversion unit 37A (37B) (VPI/VCI conversion setting of the copy cell for the alternative connection) based on the conversion table 52.

Also at this time, the central controller 25D has sent the I-ICID for the determined alternative connection and the tag and assignment relation (combination information) with the 0-ICID to the processor 45 of the target multiplexing-demultiplexing unit 23 on the input/output side. The processor 45 enters the received combination information in the VC converting table 44 so that the VC converting setting is effected for the alternative connection within the multiplexing-demultiplexing unit 23 on the input/output side.

Figure 18:
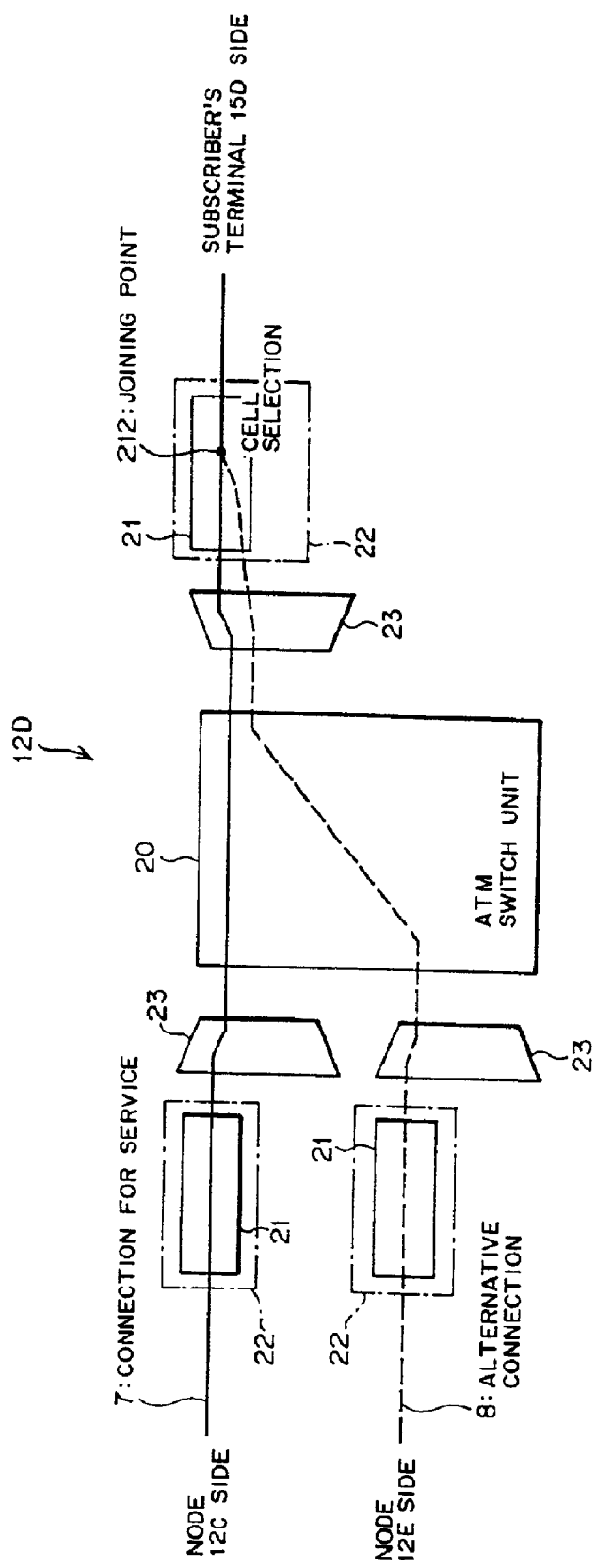
FIG. 18 is a diagram for explaining an operation of the ATM network (method of setting the alternative connection for one-way communication effected at the receiving side node) according to the embodiment of the present invention.

With the above setting processing, as for example shown in FIG. 18, the node 12D comes to have at the network individual unit 22 (network IF unit 21) on the subscriber's terminal 15D therein a joining point (switching point) 212 at which the original connection 7 and the alternative connection 8 join together. Thus, the detouring connection 8 having a route extending toward the subscriber's terminal 15D is established as shown with a broken line in FIG. 16.

In this way, when the node 12E receives PVC Setting Request Message M3 for relaying alternative connection, the node 12E carries out an operation of a virtual connection setting for relaying the alternative connection 8 which is settled in the node 12A and the node 12D by means of ordinary PVC setting processing. Thus, as shown in FIG. 16, the detouring connection 8 substitutive for the original connection 7 is set between the subscriber's terminal 15A and the subscriber's terminal 12D so as to extend from the subscriber's terminal 15A to the subscriber's terminal 12D.

Figure 19:
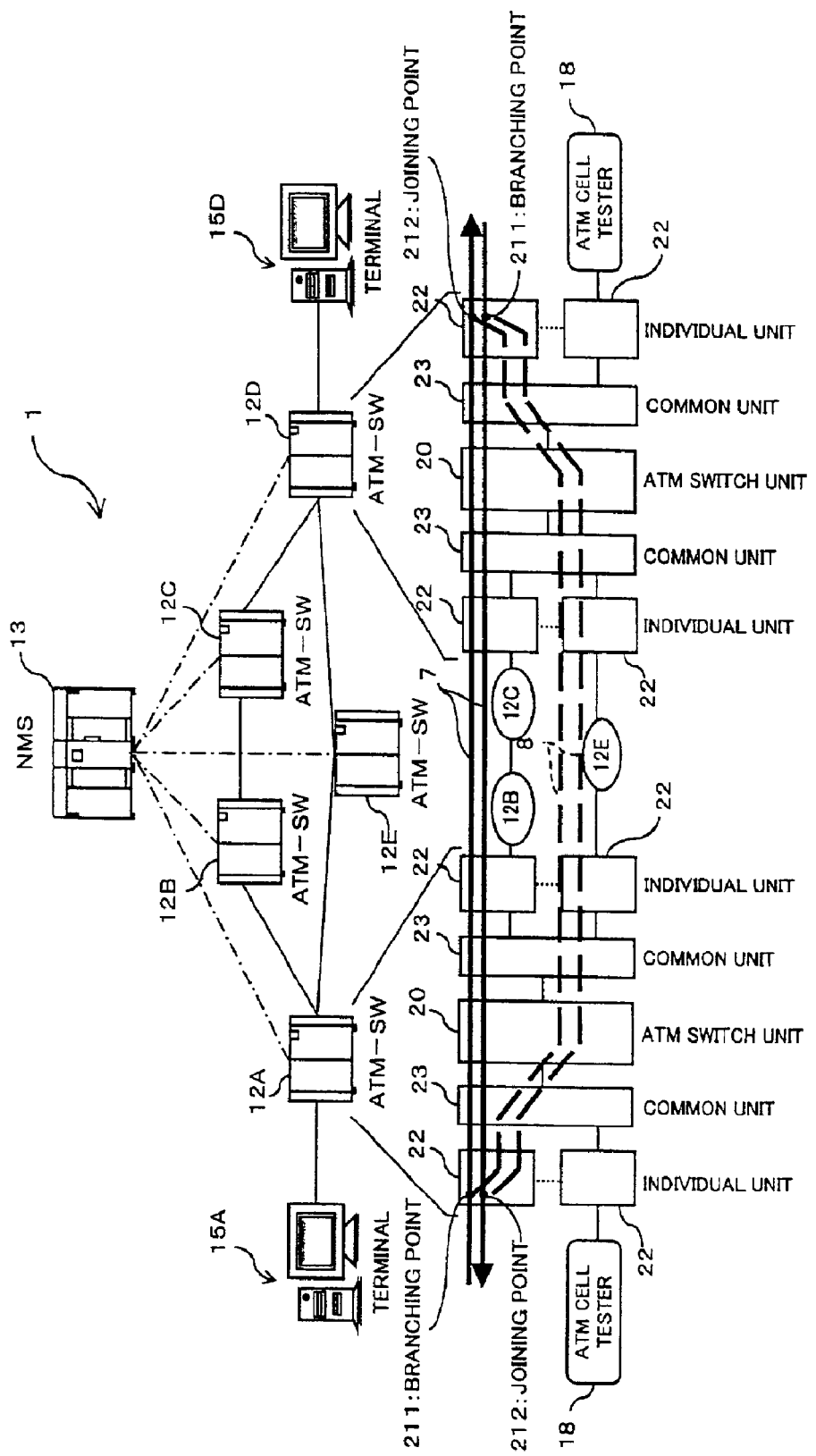
FIG. 19 is a diagram for explaining an operation of the ATM network (method of setting the alternative connection for inverse-direction communication) according to the embodiment of the present invention.

Subsequently, as described above, after the node 12A has effected the transmitting side setting of the detouring connection 8, the node 12A effects the receiving side setting of the detouring connection 8. Conversely, the node 12D, which has effected the receiving side setting of the detouring connection 8, comes to effect the transmitting side setting of the detouring connection 8. In this way, as for example shown with a broken line in FIG. 19, the detouring connection 8 substitutive for the original connection 7 is established so as to extend from the subscriber's terminal 15D to the subscriber's terminal 15A.

That is, the NMS 13 sends each of Messages M1 to M3 only one time. The nodes as destinations of the messages, i.e., the node 12A, 12E, and the terminal 15D automatically execute setting of transmitting/receiving side (i.e., setting for bidirectional communication) in response to the reception of the one-time massage reception of Messages M1 to M3. With this setting operation, the setting of the detouring connection 8 for bidirectional communication is completed (the steps so far is referred to as alternative connection setting step) However, it is needless to say that each of Messages M1 to M3 may be individually sent at each setting for transmission and reception.

As a result, the node 12 (12A or 12D) on the transmitting side is brought into a state in which an identical cell can be sent through both of the original connection 7 and the alternative connection 8. Conversely, the node 12 (12D or 12A) on the receiving side is brought into a state in which a cell transmitted through both of the original connection 7 and the alternative connection 8 can be received as an identical cell. Thus, the virtual connection extending bidirectionally between the subscriber's terminal ISA and the subscriber's terminal 15D is made redundant.

Accordingly, if a valid virtual connection is switched from the original connection 7 to the detouring connection 8, even though work of maintenance, inspection, moving facility or the like is done on the network 14 through which the original connection 7 is established, the users of the subscriber's terminals 15A and 15D who are provided with the service by using the original connection 7 can be protected from interruption of service owing to the support of the detouring connection 8. However, according to the present embodiment, the switching from the original connection 7 to the detouring connection 8 is not effected until the normality of the detouring connection 8 is confirmed after setting the detouring connection 8.

That is, the NMS 13 sends Test Start Message M4 for normality confirming processing on the detouring connection 8 to the receiving side node 12 (e.g., to the node 12D as shown in FIG. 12). When the node 12D receives Message M4 from the NMS 13, the central controller 25 of the node 12D (the test connection setting processing unit 503) initially sets a new virtual connection (test connection) 9 between the ATM switching unit 20 and the ATM cell tester 18 (VPI/VCI for testing the connection is assigned) as shown in FIG. 20.

Then, setting is made to the cell selecting unit 38A (38B) of the network individual unit 22 in which the above detouring connection 8 is settled in such a manner that the input cell added with the VPI/VCI of the detouring connection 8 is allocated with the test VPI/VCI and returned to the header converting unit 33A (33B). Further, the setting is made to the header converting unit 33A (33B) so that the test VPI/VCI allocated to the returning cell is converted into the I-ICID for the virtual connection 9 extending to the ATM cell tester 18 connected to its own node 12D.

Figure 20:
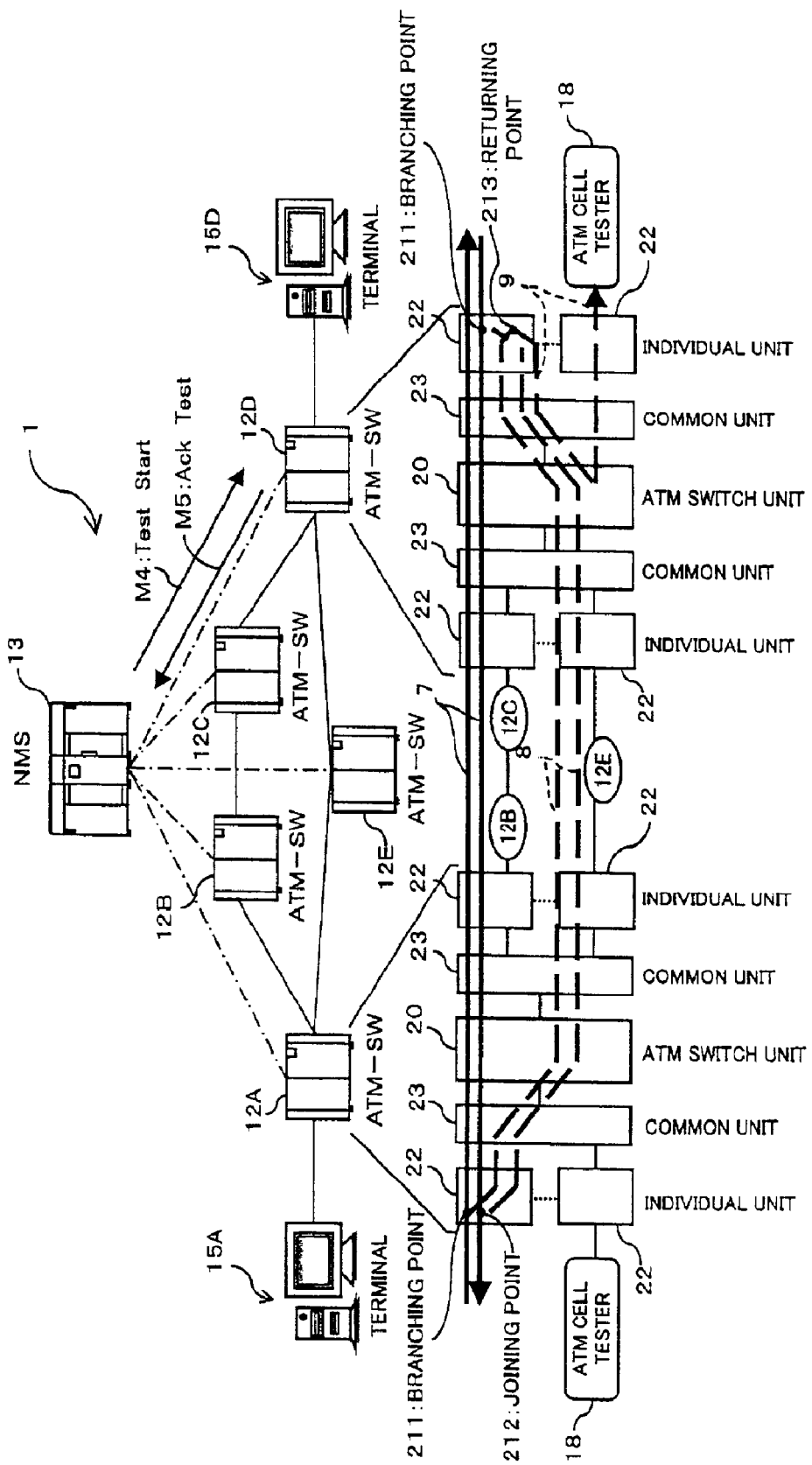
FIGS. 20, 21 and 22 are a diagram for explaining an operation of the ATM network (method of confirming normality of the alternative connection) according to the embodiment of the present invention.
Figure 21:
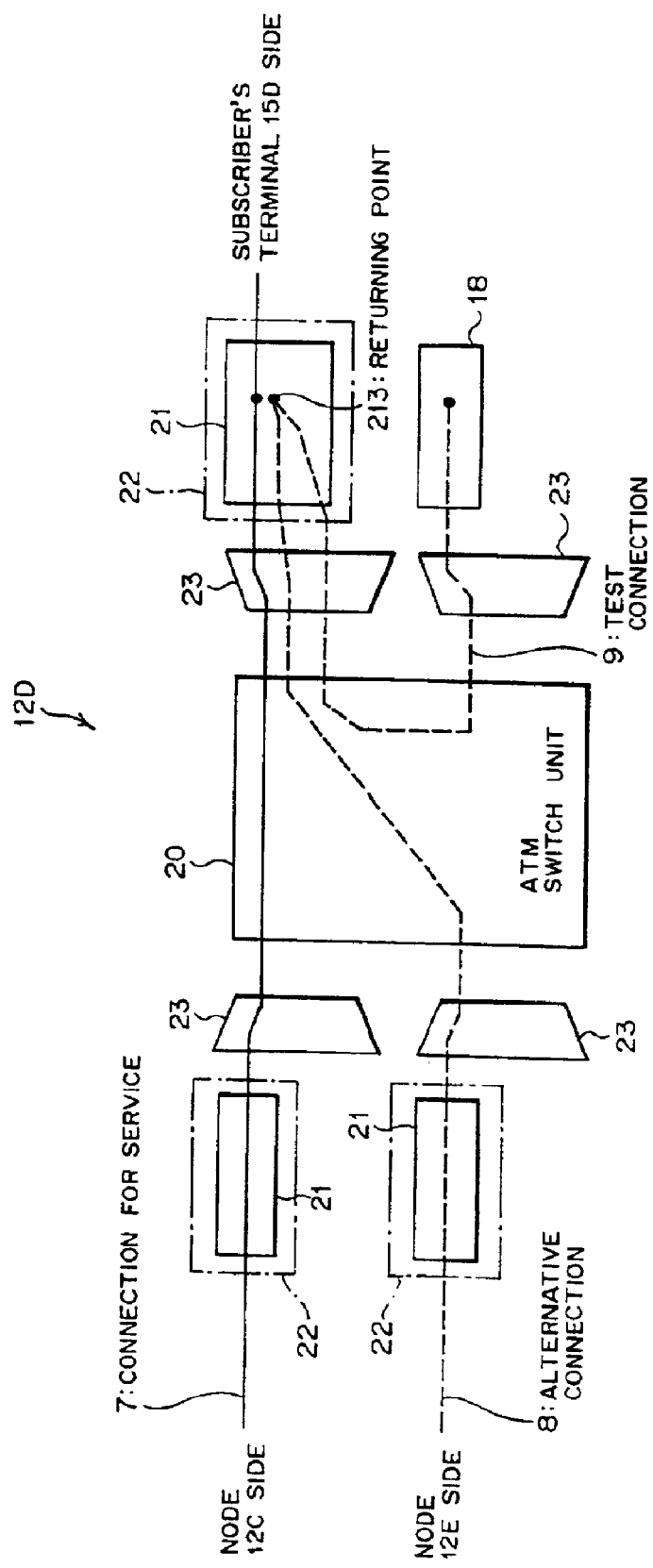

In this way, as shown in FIGS. 20 and 21, a returning point 213 is formed in the network individual unit 22 (network IF unit 21) in which the aforesaid joining point (switching point) 212 was formed. Thus, the detouring connection 8 is returned in the network individual unit 22 and made to be connected to the ATM cell tester 18 on the own node 12D. Accordingly, if an ATM cell is transported through the detouring connection 8, the ATM cell is received by the ATM cell tester 18 by way of the virtual connection 9 extending toward the ATM cell tester 18. In this way, the ATM cell tester 18 is made to receive the ATM cell which is sent from the node 12D through the virtual connection 9 and subjects the ATM cell to the test operation for examining the normality of the detouring connection 8 (from the node 12A to the node 12D), as described above (normality confirming step).

When the central controller 25D (cell copy control unit 601) receives Test Start Message M4, the central controller 25D is triggered to carry out the setting for temporarily halting the cell copy operation in the cell copy unit 32A (32B) (until the test of the alternative connection 8 is finished), in addition to the above-described returning setting. Further, if the alternative connection 8 has not been connected yet to the ATM cell tester 18, the ATM cell transported through the alternative connection 8 is discarded in the cell selecting unit 38A (38B). In this way, the ATM cell can be prevented from being transported to the subscriber's terminal 15A on the side of the node 12A upon testing the alternative connection 8.

Thereafter, if any failure is not found in normality confirming operation of the alternative connection for a predetermined period of time, the ATM cell tester 18 issues Alternative Connection Normality Confirmed (Test OK) Message to the network individual unit 22 on the side of the alternative connection receiving side. When the network individual unit 22 on the alternative connection receiving side receives Test OK Message, the network individual unit 22 restores the test VPI/VCI which is transferred to the ATM cell tester 18 to its original state, i.e., the VPI/VCI of the alternative connection 8. Then, the network individual unit 22 cuts the virtual connection 9 extending between the ATM cell tester 18 and the cell selecting unit 38A (38B). At this time, the receiving side node 12D resumes cell copy operation which was temporarily halted at the cell copy unit 32A (32B), with the result that the copy cell for the alternative connection 8 is again transmitted.

When the normality of the alternative connection 8 is confirmed in the above-described manner, the central controller 25D of the node 12D sends Test Normal Completion (Ack Test) Message (normality confirming report) M5 to the NMS 13. When the NMS 13 receives Test Normal Completion Message M5, the NMS 13 sends to the node 12A in turn, Test Start Message M6 for the alternative connection 8 which is extending from the node 12D to the node 12A.

Figure 22:
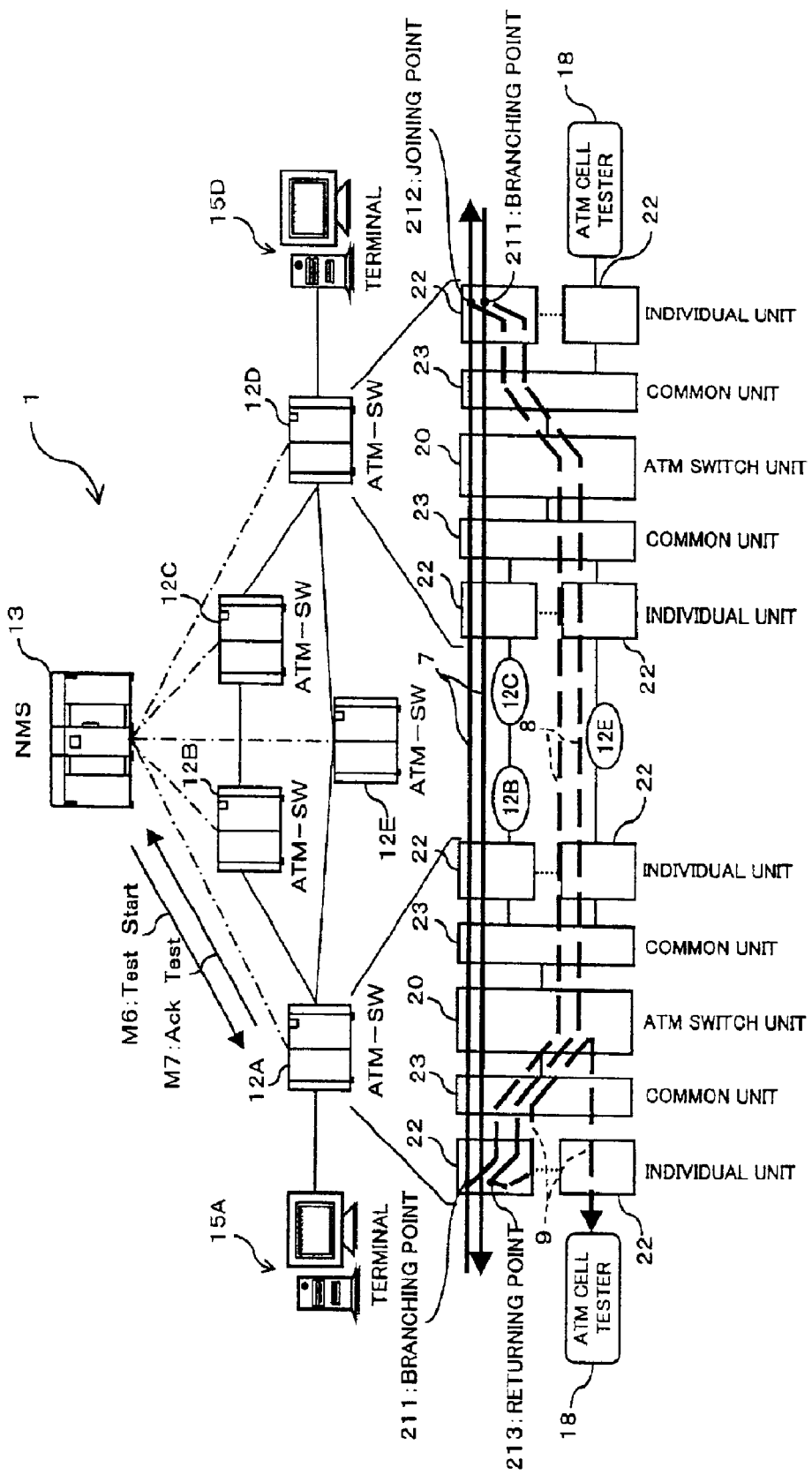

When the node 12A receives Test Start Message M6, similarly to the operation of the node 12D, the node 12A folds the alternative connection 8 extending from the node 12D to the node 12A in the network individual unit 22 to connect to the ATM cell tester 18, as shown in FIG. 22. Thus, the ATM cell tester 18 examines the normality of the alternative connection 8 for a predetermined period of time. If the normality of the alternative connection extending from the node 12D to the node 12A is confirmed as a result of the test, the central controller 25A of the node 12A sends Test Normal Completion (Ack Test) Message M7 to the NMS 13.

Figure 23:
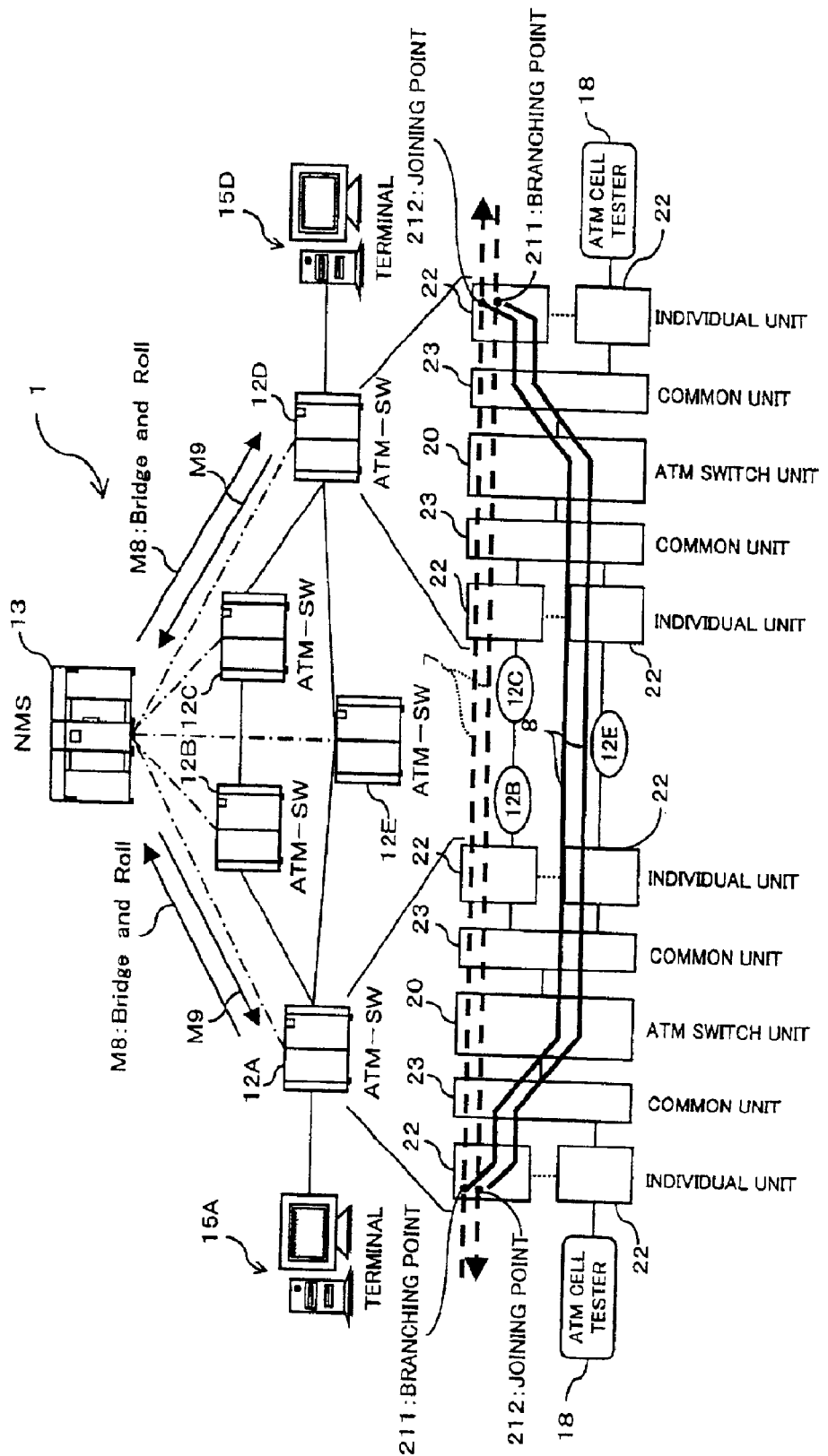
FIG. 23 is a diagram for explaining an operation of the ATM network (connection switching) according to the embodiment of the present invention.

When the normality of the alternative connection 8 is confirmed bidirectionally as described above, as shown in FIG. 23, the NMS 13 sends Switching (Bridge and Roll) Message (switching command) M8 to the node 12A and node 12D so that connection is switched from the original connection 7 to the alternative connection 8.

When the nodes 12A and 12D receives Switching Message M8, the central controllers 25A and 25D (test switching unit 603) of the respective nodes 12A and 12D effect replacement on the switching flag 51d and the enable bit 53 of the above-described alternative connection assignment table 51 and the receiving side header inverse conversion table 52 between one for the original connection 7 and that for the alternative connection 8, whereby the ATM cell (copy cell) of the alternative connection 8 is made valid while the original cell of the copy source is made invalid. Thus, switching from the original connection 7 to the alternative connection 8 is effected (connection switching step).

In other words, the connection switching step is arranged to include the steps of confirming the normality of the alternative connection 8, then bringing an identical user cell to a standby mode to be transmitted to both of the original connection and the alternative connection 8, and thereafter releasing the setting of the original connection. Accordingly, it becomes possible to realize highly reliable connection switching by a simple control.

Then, when the connection switching is completed, the central controllers 25A and 25D of the respective nodes 12A and 12D send Switching Completion (Ack Bridge and Roll) Message M9 to the NMS 13. If maintenance or inspection of the network 14 on which the original connection is established is completed, with the result that the alternative connection 8 is again to be replaced with the original connection 7, then a switching message for instructing the replacement may be sent to each of the nodes 12A and 12D.

If the connection is to be switched back from the alternative connection 8 to the original connection 7, the central controllers 25A and 25D (test switching unit 603) of the respective nodes 12A and 12D effect replacement on the switching flag 51d and the enable bit 53 between one for the original connection 7 and that for the alternative connection 8, whereby the ATM cell (the original cell) of the original connection 8 is made valid while the ATM cell of the alternative connection 8 is made invalid (copy cell processing is halted). Thus, switching from the alternative connection 8 to the original connection 7 is effected.

As described above, according to the ATM network 1 of the present embodiment, a virtual connection having a route physically different from that of the original connection 7 (as a target of sheltering) is established as an alternative connection (detouring connection) so that the virtual connection is made redundant, and thereafter switching can be effected between the virtual connections 7 and 8. Therefore, when the network 14 having the original connection established therein undergoes maintenance or inspection or the facility of the network 14 is to be moved to another place, the user of the connection service can be free from interruption in connection service. Accordingly, the connection service can be continuously provided to the user regardless of the maintenance or inspection or movement of the facility, with the result that service quality provided to the user can be remarkably improved.

When the connection is switched from the original connection 7 to the alternative connection 8, the transmitting side node 12A or 12D carries out only a simple control operation, i.e., the transmitting side node 12A or 12D makes the original cell of the original connection invalid while the copy cell for the alternative connection 8 valid, whereby switching from the original connection 7 to the alternative connection 8 is accomplished. On the other hand, the cell copy processing itself is halted and the original cell is made valid as a transmitting cell, whereby switching from the alternative connection 8 to the original connection 7 is accomplished. Accordingly, the arrangement of the transmitting side node 12A or 12D provides great contribution to the simplification of the communication system.

Conversely, when the connection is switched from the original connection 7 to the alternative connection 8, the receiving side node 12D or 12A inversely converts the VPI/VCI of the copy cell which was attached with the VPI/VCI of the alternative connection 8 at the transmitting side node 12A or 12D into the VPI/VCI of the original connection 7 so that the cell of the alternative connection can be received as the cell of the original connection 7, whereby the virtual connection is made redundant. Therefore, switching from the original connection 7 to the alternative connection 8 can be accomplished by a simple control operation carried out by the cell selecting unit 38B, i.e., the cell selecting unit 38B selects either of the copy cell or the original cell as a receiving cell. Accordingly, the arrangement of the receiving side node 12D or 12A provides great contribution to the simplification of the communication system.

Further, before switching from the original connection 7 to the alternative connection 8, the ATM cell tester 18 confirms the normality of the established alternative connection 8. Therefore, it becomes possible to avoid an undesirable operation that the original connection is switched to the alternative connection 8, with the result that reliability of the connection switching can be remarkably improved.

Particularly, according to the arrangement of the present embodiment, the ATM cell tester 18 of the alternative connection carries out the folding connection processing and the normality of the alternative connection 8 is examined by using the virtual connection 9 deriving from the returning connection processing. Therefore, a new line exclusively utilized for the testing need not be provided, with the result that it becomes possible to improve the reliability of the connection switching and simplify the arrangement of the node 12. It is needless to say that a new line exclusively utilized for the testing may be provided to carry out the examination of the normality of the alternative connection 8 in a manner similar to the above-described one.

Further, when the testing of the alternative connection 8 is carried out, normality confirmation is effected on all of the physical layer, AAL1 layer and ATM layer, and switching from the original connection 7 to the alternative connection 8 is not effected until the normality is confirmed on all of the layers. Therefore, the alternative connection 8 can be utilized for communication in a more reliable manner, and it becomes possible to decrease the probability that the connection service halting state is brought about due to the connection switching operation.

Furthermore, according to the arrangement of the present embodiment, when the NMS 13 receives Test Normal Completion Messages M5 and M7 from the ATM cell tester 18, the NMS 13 is triggered to collectively send a command designating the switching from the original connection 7 to the alternative connection 8, to the central controller 25 (connection switching control unit 6), which constitute the switching control means, of the nodes 12A and 12D. Thus, switching operation can be effected with ease.

While in the above example description has been made on a case in which an alternative connection 8 is set for only one original connection 7 and switching is made to the alternative connection 8, alternative connections 8 may be established for a plurality of original connections 7, respectively, and switching may be made to the alternative connections 8, respectively. In this case, the above-described procedure may be repeated.

In this case, Alternative Connection Setting Request Message, Test Start Message and Switching Message shall be prepared a number corresponding to the number of original connections as a target of sheltering. Further, the number of Alternative Connection Setting Request Messages, Test Start Messages and Switching Messages may be sent by a single shot of message sending operation so that a plurality of alternative connections 8 can be set, the normality of the alternative connections 8 can be confirmed and that connection switching of the alternative connections 8 can be effected at a time.

While in the above example the alternative connection 8 is settled bidirectionally for the original connection 7 which is settled bidirectionally, if the original connection 7 is settled in a one-way communication manner, the alternative connection 8 may be settled in the one-way communication manner for the original connection 7.

Further, although in the above example the ATM cell tester 18 confirms the normality of the settled alternative connection 8 and thereafter switching to the alternative connection 8 is effected, it is needless to say that this switching may be effected without doing the confirmation of the normality of the settled alternative connection 8.

Furthermore, although in the above example the type 1 (ALL1) of the ATM adaptation layer is examined as the test of the alternative connection 8, it is obvious that other type of the ATM adaptation layer may be examined as the test of the alternative connection 8 depending on the type of service supported by the communication system.

(B2) Description of Modification

The operation for making the virtual connection redundant may be accomplished by utilizing an existing point-to-multipoint communication setting function possessed by the node 12. That is, as for example schematically shown in FIG. 24, when the alternative connection transmitting side node 12 receives Alternative Connection Setting Request Message from the NMS 13, the node 12 controls its internal components such as the ATM switch unit 20, the common unit (multiplexing-demultiplexing unit) so that a point-to-multipoint connection connecting to the alternative connection receiving side node 12 is established.

Figure 24:
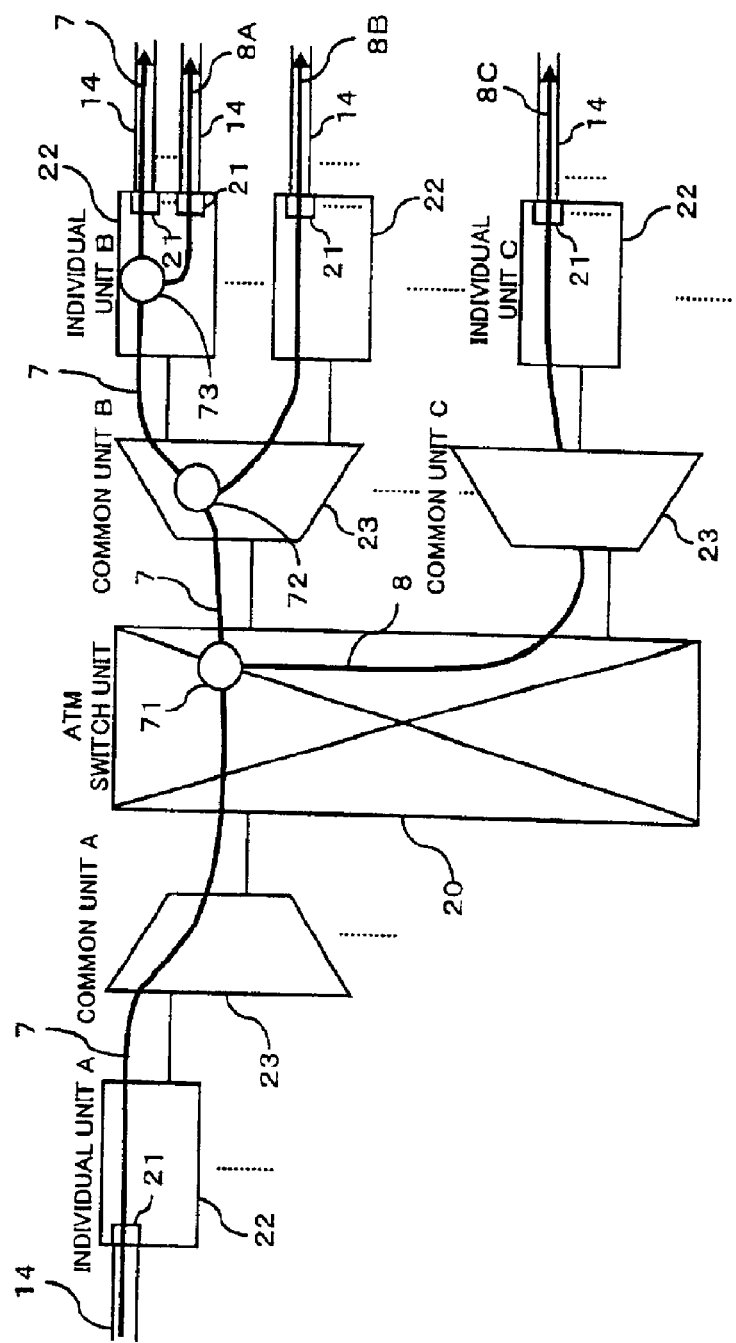
FIG. 24 is a diagram for explaining the method of setting connection and the method of switching connection as a modification according to the embodiment of the present invention.
Figure 25:
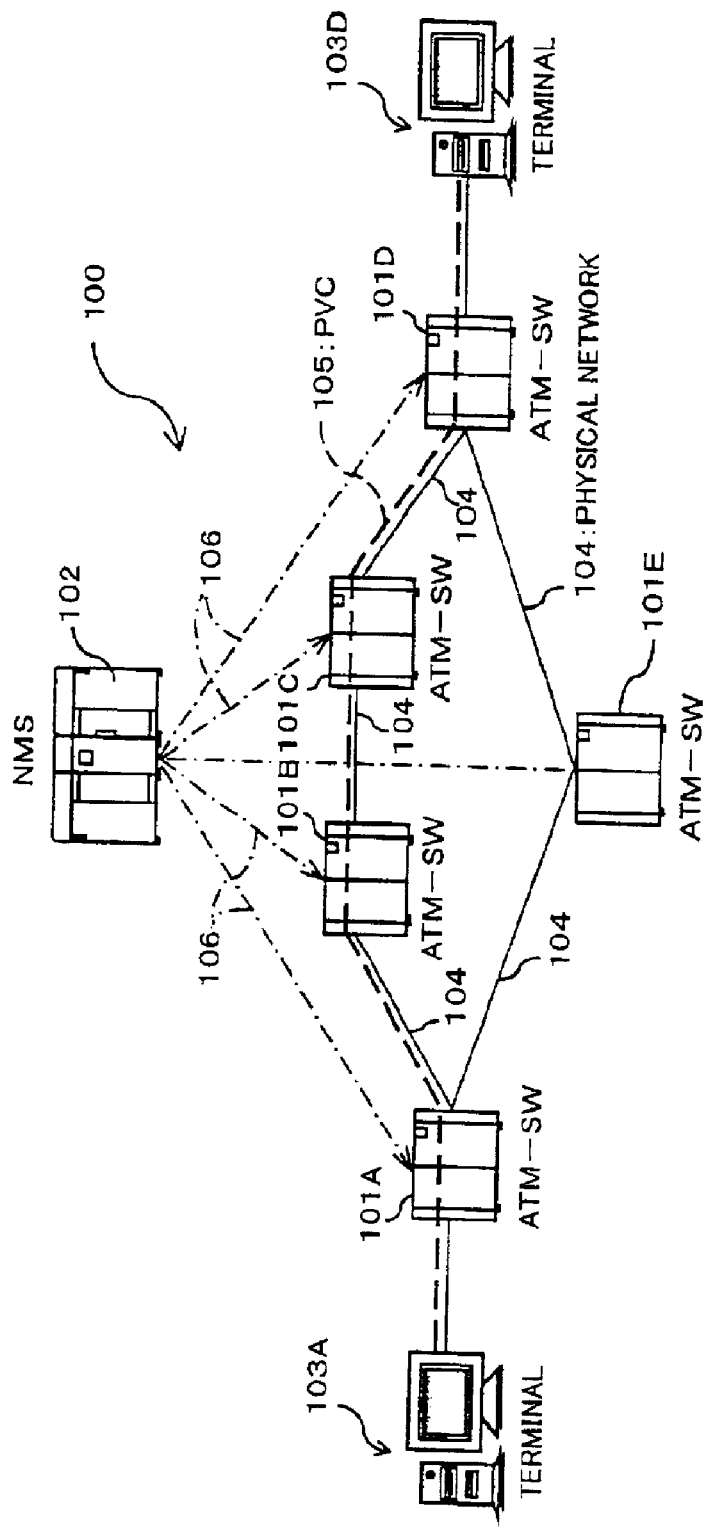
FIG. 25 is a block diagram showing one example of a conventional ATM network.

In FIG. 24 for example, if the original connection 7 extends through a network individual unit A, a common unit A, an ATM switch unit 20, a common unit B, and a network individual unit B, a point-to-multipoint connection can be set at points 71 to 73 so that three kinds of alternative connections 8 (8A to 8C) are set for the connection 7. The above points 71 to 73 are points in which a cell copy operation can be carried out for the network 14 having the alternative connection 8 included.

That is, the virtual connection 7 as a target of sheltering serves as a primary reef of the point-to-multipoint connection while the alternative connections 8 serve as a common reef. Under this condition, if the transmitting node 12 receives from the NMS 13 a switching request message for switching from the original connection 7 to the alternative connection 8, the primary reef of the point-to-multipoint connection may be deleted. Thus, the switching from the original connection 7 to the alternative connection 8 can be accomplished.

As for example shown in FIG. 24, if the original connection is a connection designated by reference numeral 7 and the alternative connection is one designated by reference numeral 8A, a downstream portion of the connection 7 as the primary reef may be deleted at the point 73. Thus, the original connection comes to include the connection 8A as a common reef.

Further, if the original connection is a connection designated by reference numeral 7 and the alternative connection is one designated by reference numeral 8B, a downstream portion of the connection 7 as the primary reef may be deleted at the point 72. Thus, the original connection comes to include the connection 8B as a common reef.

Furthermore, if the original connection is a connection designated by reference numeral 7 and the alternative connection is one designated by reference numeral 8C, a downstream portion of the connection 7 as the primary reef may be deleted at the point 71. Thus, the original connection comes to include the connection 8C as a common reef.

In this way, if the point-to-multipoint connection setting function is utilized, the connection switching function can be flexibly implemented with ease.

(C) Other Disclosure

While in the above-described embodiment description has been made on a case in which the virtual connection is fixed (PVC), the present invention is not limited thereto, but the present invention can be applied to a case of SVC in which the VPI/VCI is dynamically assigned to a cell at every new call. That is, the central controller 25 may be arranged to detect a VPI/VCI which makes it possible to distinguish a virtual connection 8 having a route physically different from that of the virtual connection 7 which is identified by a VPI/VCI assigned to the corresponding call.

In the case of SVC mode, however, if the original connection 7 is cut due to the termination of the call, data indicative of the I-ICID of the call and termination of the call are sent to the corresponding common unit 23 and the network individual unit 22, with the result that the setting of the alternative connection 8 is automatically released (i.e., the information entered in the alternative connection assignment table 51 and the receiving side header inverse conversion table 52 are deleted).

While in the above embodiment description has been made on a case in which an ATM switching apparatus is applied to the node apparatus, the present invention is not limited thereto, but the present invention can be similarly applied to any type of apparatus so long as the apparatus is arranged to communicate by a communication (virtual) connection setting.

Further, in the above embodiment, when the alternative connection 8 is set, the NMS 13 sends a setting request message to each of the nodes 12A, 12E, 12D on the route of the alternative connection 8. However if SETUP Message of the SVC is arranged to contain route information designating the route of the alternative connection set, then it becomes sufficient to send the setting request message to only the transmitting side node 12A (or 12D) of the alternative connection 8 for establishing the alternative connection 8 in a similar manner.

In the above case, the NMS 13 sends, a setting request message containing, for example, ① call originating point code information (transmitting side node identification information, call originating line number, call originating VPI/VCI and so on), ② call termination point code information (receiving side node identification information, call termination line number, call termination VPI/VCI), and ③ passing relaying node information [relaying node identification information (e.g., identification information of the node 12E)], to only the transmitting side node 12A as the above route information. If the route of the alternative connection 8 to be established includes a plurality of relaying nodes, the relaying node identification information is made to have each of the identification information.

When the transmitting side node 12A receives the setting request message from the NMS 13, then the transmitting side node 12A carries out the setting operation of the alternative connection 8 similar to that of the aforesaid alternative connection 8 based on the call originating point code information denoted by ①. Further, the transmitting side node 12A creates SETUP Message for the relaying node 12E which is identified by the passing relaying node information denoted by ③, arranges SETUP Message so as to include information denoted by the above notations ① to ③, and sends SETUP Message to the relaying node 12E.

When the relaying node 12E receives SETUP Message, the relaying node 12E carries out the relaying setting operation of the alternative connection 8 similar to that of the aforesaid alternative connection 8 based on the call originating point code information denoted by ① and the call termination point code information denoted by ②. On the other hand, the relaying node 12E determines whether another relaying node 12 is present or not based on the relaying node information denoted by ③. If it is determined that there is another relaying node, then the relaying node 12E sends SETUP Message same as above to the relaying node 12 placed on the next stage.

The SETUP signal is transferred from one node 12 to the next node 12 on the designated route until there is no node 12 found on the next stage on the route, i.e., the finally found node 12 as the next node is identified as the receiving side node 12D designated by the NMS 13. When the receiving side node 12D receives SETUP Message, then the receiving side node 12D carries out the setting operation of the alternative connection 8 similar to that of the aforesaid alternative connection 8 based on the call termination point code information denoted by ②.

As described above, when the NMS 13 sends a setting request message to the transmitting side node 12A one time, all of the connection setting process can be controlled on the nodes 12 placed on the route on which the alternative connection 8 is established. Therefore, a maintenance engineer or the like can be remarkably relieved from labor for setting connection.

The present invention is not limited to the above-described embodiments and modifications, and it is to be understood that various changes and modifications may be effected without departing from the gist of the present invention.

What is claimed is:

1. A connection oriented mode communication system for use in a communication system composed of a plurality of node apparatus, comprising:

alternative connection setting means for setting a communication connection as an alternative connection substitutive for an original connection which is a currently working communication connection, so that the alternative connection connects a source node apparatus and a destination node apparatus of the original connection to each other by way of a route physically different from that of the original connection;

switching control means for controlling switching between the original connection and the alternative connection;

a connection test unit connected to a node apparatus testing the normality of the alternative connecting, the connection test unit includes a layer normality confirming means for confirming the normality of each of a physical layer, an adaptation layer and an ATM layer of the alternative connection, wherein the alternative connection setting processing means includes a test connection setting processing unit which carries out setting processing of a test communication connection which leads the alternative connection to the connection test unit, the switching control means includes a test switching unit which carries out switching from the original connection to the alternative connection when the connection test unit confirms the normality of the alternative connection, and the test switching unit is arranged to carry out switching from the original connection to the alternative connection when the layer normality confirming means confirms the normality of all layers.

2. A connection oriented mode communication system according to claim 1, wherein the switching control means is arranged not to carry out switching from the original connection to the alternative connection until the connection test unit confirms the normality of the alternative connection.

3. A connection oriented mode communication system according to claim 2, further comprising a network management unit which issues a command of switching from the original connection to the alternative connection to the switching control means when the network management unit receives a notice of normality confirmation of the alternative connection from the connection test unit.

4. A node apparatus for use in a connection oriented mode communication system, comprising:

an alternative connection setting processing unit for setting a communication connection as an alternative connection substitutive for an original connection which is a currently working communication connection, so that the alternative connection connects a source node apparatus and a destination node apparatus of the original connection to each other by way of a route physically different from that of the original connection; and a switching control unit for controlling switching between the original connection and the alternative connection;

a connection test unit connected to said node apparatus testing the normality of the alternative connection, the connection test unit includes a layer normality confirming means for confirming the normality of each of a physical layer, an adaptation layer and an ATM layer of the alternative connection, wherein the alternative connecting setting processing unit includes a test connection setting processing unit which carries out setting processing of a test communication connection which leads the alternative connection to the connection test unit, the switching control unit includes a test switching unit which carries out switching from the original connection to the alternative connection when the connection test unit confirms the normality of the alternative connection, and the test switching unit is arranged to carry out switching from the original connection to the alternative connection when the layer normality confirming means confirms the normality of all layers.

5. A node apparatus for use in a connection oriented mode communication system according to claim 4, further comprising a cell copy unit for copying transmission cell data which is attached with identification information of the original connection and which the attached cell's destination is a receiving side node apparatus, wherein the alternative connection setting processing unit includes an identification information setting processing unit for carrying out processing for setting identification information of the alternative connection to copy cell data, created by the cell copy unit.

6. A node apparatus for use in a connection oriented mode communication system according to claim 5, wherein the connection switching control unit includes a cell copy control unit which carries out switching from the original connection to the alternative connection in such a manner that original transmission cell data, which is attached with identification information of the original connection and which the attached cell's destination is a receiving side node apparatus, is made invalid while the copy cell data created by the cell copy unit is made valid as transmission cell data of which destination is a receiving side node apparatus.

7. A node apparatus for use in a connection oriented mode communication system according to claim 6, wherein the cell copy control unit is arranged such that the cell copy unit is halted from cell copy operation and the original transmission cell data is made valid, whereby switching from the alternative connection to the original connection is accomplished.

8. A node apparatus for use in a connection oriented mode communication system according to claim 5, wherein the alternative connection setting processing unit includes an identification information conversion setting processing unit for carrying out identification information conversion setting processing which makes it possible for the node apparatus to receive the copy cell data transmitted from the transmission side node apparatus as the original cell data transmitted from the transmission side node apparatus.

9. A node apparatus for use in a connection oriented mode communication system according to claim 8, wherein the connection switching control unit includes a cell selection control unit which carries out switching from the original connection to the alternative connection by control of selecting the copy cell data and carries out switching from the alternative connection to the original connection by control of selecting the original cell data.

10. A node apparatus for use in a connection oriented mode communication system according to claim 4, wherein the layer normality confirming means is arranged to confirm coordination of the alternative connection.

11. A method of setting connection comprising:

an alternative connection setting step for setting a communication connection as an alternative connection substitutive for an original connection which is a currently working communication connection, so that the alternative connection connects a source node apparatus and a destination node apparatus of the original connection to each other by way of a route physically different from that of the original connection;

a connection switching step for switching between the original connection and the alternative connection; and a connection test step for testing the normality of the alternative connection by establishing a communication connection to the alternative connection, wherein the connection switching step is arranged to execute switching from the original connection to the alternative connection when the normality of the alternative connection is confirmed at the connection test step, the connection test step includes a layer normality confirming step for confirming the normality of each of a physical layer, an adaptation layer and an ATM layer of the alternative connection, and the connection switching step is arranged not to switch from the original connection to the alternative connection until the normality is confirmed for all layers at the layer normality confirming step.

12. A method of setting connection according to claim 11, wherein the layer normality confirming step includes a step for confirming coordination of the alternative connection.

13. A method of setting connection according to claim 11, wherein the connection switching step includes a step for releasing the setting of the original connection after the original connection and the alternative connection are brought to a state in which an identical user cell can be transmitted through the original connection and the alternative connection.

14. A method of setting connection according to claim 11, wherein the connection switching step includes a step for releasing the setting of the original connection after the original connection and the alternative connection are brought to a state in which an identical user cell can be transmitted through the original connection and the alternative connection.

15. A method of setting connection according to claim 12, wherein the connection switching step is arranged to include a step for releasing the setting of the original connection after the original connection and the alternative connection are brought to a state in which an identical user cell can be transmitted through the original connection and the alternative connection.

16. A method of setting connection comprising:

establishing a first communication connection between a source node apparatus and a destination node apparatus;

establishing a second communication connection as an alternative connection substitutive for the first communication connection so that the second connection connects the source node apparatus and the destination node apparatus of the first communication connection to each other by way of a route physically different from that of the first communication connection;

testing the normality of the alternative connection by establishing a communication connection to the alternative connection and confirming the normality of each of a physical layer, an adaptation layer and an ATM layer of the alternative connection; and switching from the original connection to the alternative connection when the normality of the alternative connection is confirmed at the testing step, wherein the switching step is arranged not to switch from the original connection to the alternative connection until the normality is confirmed for all layers at the testing step.

* * * * *